United States Patent
Mallicote et al.

(10) Patent No.: US 11,273,873 B2
(45) Date of Patent: Mar. 15, 2022

(54) FENDER FLARE

(71) Applicant: Bodyguard Products LLC, Paris, TX (US)

(72) Inventors: Charles Grant Mallicote, Sumner, TX (US); Kelli Renee Mallicote, Sumner, TX (US); Caleb Michael Hix, Paris, TX (US)

(73) Assignee: BODYGUARD PRODUCTS LLC, Paris, TX (US)

( * ) Notice: Subject to any disclaimer, the term of this patent is extended or adjusted under 35 U.S.C. 154(b) by 0 days.

(21) Appl. No.: 16/590,240

(22) Filed: Oct. 1, 2019

(65) Prior Publication Data

US 2020/0108873 A1    Apr. 9, 2020

Related U.S. Application Data

(60) Provisional application No. 62/740,871, filed on Oct. 3, 2018.

(51) Int. Cl.
*B62D 25/18* (2006.01)
*B62D 25/16* (2006.01)

(52) U.S. Cl.
CPC .......... *B62D 25/18* (2013.01); *B62D 25/161* (2013.01)

(58) Field of Classification Search
CPC .... B62D 25/18; B62D 25/163; B62D 25/161; B60R 3/00; B60R 19/18
See application file for complete search history.

(56) References Cited

U.S. PATENT DOCUMENTS

| | | | |
|---|---|---|---|
| 5,511,808 A * | 4/1996 | Rowland | B62D 25/163 280/157 |
| 7,044,515 B2 * | 5/2006 | Mooijman | B60R 19/18 293/102 |
| D582,825 S | 12/2008 | Logan | |
| D610,511 S * | 2/2010 | Dubanowski | D12/181 |
| D652,358 S | 1/2012 | Hodges | |
| D712,324 S | 9/2014 | McFarlin et al. | |
| 8,882,121 B2 * | 11/2014 | Ducroquet | B62D 25/18 280/157 |
| 9,278,716 B1 | 3/2016 | Joseph et al. | |
| D756,870 S | 5/2016 | Tsutamori | |
| D758,935 S | 6/2016 | Platto et al. | |
| 9,403,557 B1 | 8/2016 | Sharma | |
| D765,569 S | 9/2016 | Hall et al. | |
| 9,487,238 B2 | 11/2016 | Iwano et al. | |
| D775,031 S | 12/2016 | Frascella | |
| D778,795 S | 2/2017 | Johns et al. | |

(Continued)

OTHER PUBLICATIONS

Jeep JL Rear Fender Flares for 18-Pres Wrangler JL Black Ravager Series Hammerhead Armor | Hammerhead Armor.

(Continued)

*Primary Examiner* — James A Shriver, II
*Assistant Examiner* — Michael T. Walsh
(74) *Attorney, Agent, or Firm* — Knobbe, Martens, Olson & Bear LLP

(57) ABSTRACT

A fender flare has a mounting plate portion, a fender portion, and a plurality of strut plates. The mounting plate portion is configured to be mounted to a wheel well of a vehicle body. The plurality of strut plates support the fender portion relative to the mounting plate portion. A step assembly and modular bumper assemblies are also disclosed.

22 Claims, 38 Drawing Sheets

(56) References Cited

U.S. PATENT DOCUMENTS

| | | |
|---|---|---|
| D781,193 S | 3/2017 | McMath |
| D785,522 S | 5/2017 | McMath |
| D787,395 S | 5/2017 | Curic et al. |
| D790,418 S | 6/2017 | McMath |
| 9,669,876 B2 | 6/2017 | Iwano |
| 9,738,322 B2 | 8/2017 | Matthiessen et al. |
| D803,119 S | 11/2017 | Beermann |
| D803,741 S | 11/2017 | Tsubaki |
| D805,013 S | 12/2017 | Whitla et al. |
| D806,622 S | 1/2018 | Granlund |
| D807,261 S | 1/2018 | Zavatski |
| 9,890,966 B2 | 2/2018 | Mueller |
| D817,829 S | 5/2018 | Behmer et al. |
| D820,751 S | 6/2018 | Luk |
| D823,741 S | 7/2018 | Kim |
| 10,023,241 B2 | 7/2018 | Umemoto |
| 10,035,543 B2 | 7/2018 | Sato |
| D826,811 S | 8/2018 | Lim |
| D827,527 S | 9/2018 | Loeb |
| D827,528 S | 9/2018 | Gueler et al. |
| D827,529 S | 9/2018 | Al Attar |
| D828,254 S | 9/2018 | Simm |
| 10,077,085 B2 | 9/2018 | Pfaffelhuber |
| 2007/0182151 A1* | 8/2007 | Aulabaugh ............ B62D 25/18 280/849 |

OTHER PUBLICATIONS https://hammerheadarmor.com/product/jeep-jl-gladiator-replacement-front-flare-2018-20xx/.

Jeep JL 2018—20XX, Ravager Rear Flare Installation Instructions, 600-56-0827, dated Sep. 24, 2018, in 6 pages.

Jeep JL 2018—20XX, Ravager Rear Flare Installation Instructions, 600-56-0829, dated Sep. 24, 2018, in 7 pages.

Hammerhead, "Hammerhead Front Armor Flares Installation Instructions: 2007-2017 Jeep JK", dated Nov. 14, 2016, in 4 pages.

Hammerhead Armor Facebook page imagine post of Fender Armor dated Jan. 18, 2017.

* cited by examiner

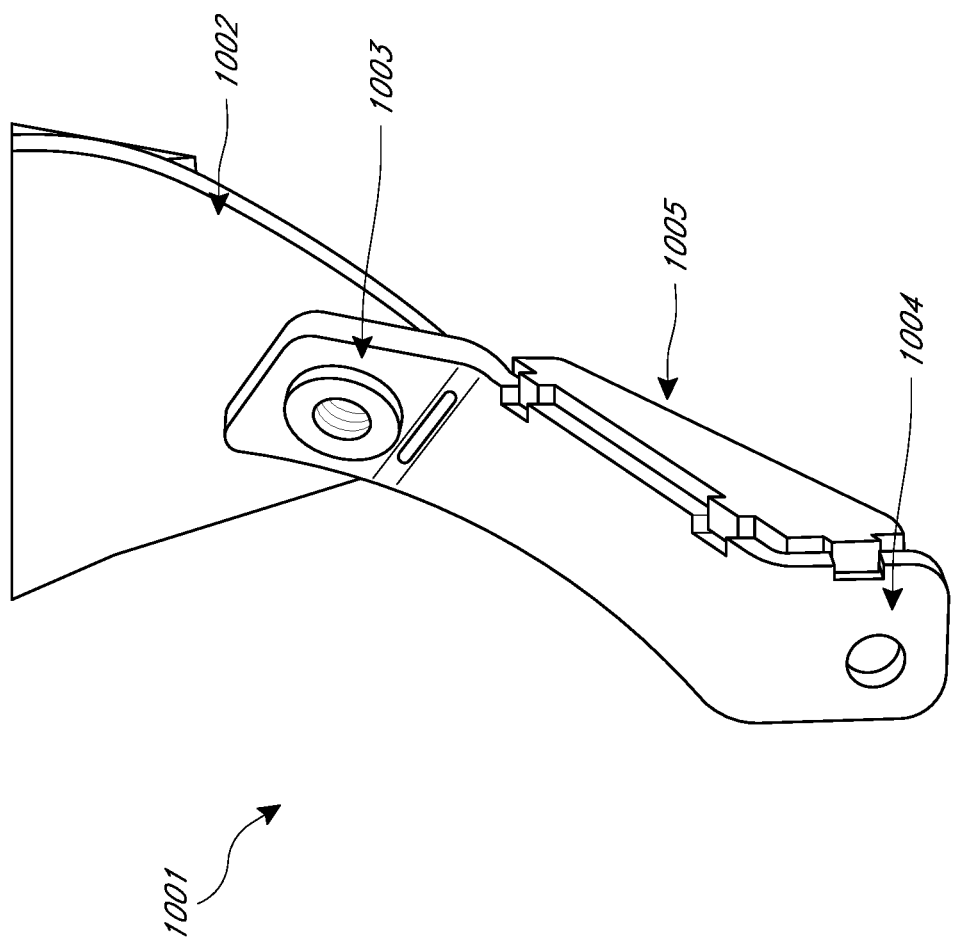

FENDER FLARE

RELATED APPLICATION

This application claims the benefit of U.S. Provisional Patent Application No. 62/740,871, filed Oct. 3, 2018, titled FENDER FLARES, BUMPERS AND SIDE STEPS, the entirety of which is incorporated by reference herein and made a part of the present disclosure.

BACKGROUND

Field

The disclosure generally relates to vehicle replacement parts. In particular, the disclosure relates to replacement fender flares, bumpers, and side steps.

Description of Related Art

Many vehicles are manufactured having stock or OEM fender flares that attach around the vehicles' wheel wells (front and/or rear wheels). It is common for the stock fender flares to be replaced with aftermarket products. The aftermarket fender flares can be sized differently than stock fender flares to accommodate other modifications of the vehicle (such as larger wheels). The aftermarket fender flares can also be made of different or more durable materials. The aftermarket fender flares can also change the appearance of the vehicle. Other portions of the vehicle can also be replaced with aftermarket products or certain aftermarket products can be added, such as the bumpers and side steps.

SUMMARY

The systems, methods and devices described herein have innovative aspects, no single one of which is indispensable or solely responsible for their desirable attributes. Without limiting the scope of the claims, some of the advantageous features will now be summarized.

An aspect of the present disclosure involves a fender flare having a mounting plate portion, a fender portion, and a plurality of strut plates. The mounting plate portion is configured to be mounted to a wheel well of a vehicle body. The plurality of strut plates support the fender portion outwardly or above the mounting plate portion such that a gap is present between an edge of the mounting plate portion and an adjacent edge of the fender portion.

In some configurations, the mounting plate portion includes a generally flat plate and a plurality of apertures for receiving mechanical fasteners to mount the fender flare to the vehicle body at the wheel well.

In some configurations, the mounting plate portion comprises one or more angled portions connecting thereto. The angled portions include one or more apertures for receiving mechanical fasteners to mount the fender flare to the vehicle body at the wheel well.

In some configurations, the strut plates are attached at a first end to the mounting plate portion and at a second end to the fender portion.

In some configurations, each of the strut plates include a cutout section that when the fender flare is assembled to the body of the wheel well of the vehicle extend outwardly and around a curved ridge of the wheel well of the vehicle body.

In some configurations, the first and second ends of the strut plates are at an angle between 60 and 120 degrees.

In some configurations, the first and second ends of the strut plates are at right angles.

In some configurations, the gap provides an offset between the mounting plate and the fender portion. A curved ridge of the wheel well is received within the gap when the fender flare is assembled with the vehicle body.

In some configurations, the gap portion extends throughout a length of the fender flare.

In some configurations, the fender flare has a first end and a second end. The fender portion and the mounting plate portion are connected at the first or second ends and the gap extends between the first and second ends.

In some configurations, the plurality of strut plates each extend from the mounting plate portion perpendicularly and coupled with the fender portion perpendicularly.

In some configurations, the fender flare is formed of one of a steel, an aluminum, or a plastic material.

In some configurations, the fender flare is formed of a plurality of steel pieces coupled together.

An aspect of the present disclosure involves a fender flare having a mounting plate portion, a fender portion, and a plurality of strut plates. The mounting plate portion is configured to be mounted to a wheel well of a vehicle body. The plurality of strut plates support the fender portion relative to the mounting plate portion.

In some configurations, the mounting plate portion comprises a generally flat plate and includes a plurality of apertures for receiving mechanical fasteners to mount the fender flare to the vehicle body at the wheel well.

In some configurations, the mounting plate portion comprises one or more angled portions connected thereto, the angled portions including one or more apertures for receiving mechanical fasteners to mount the fender flare with the vehicle body at the wheel well.

In some configurations, the strut plates are attached at a first end to the mounting plate portion and at a second end to the fender portion.

In some configurations, the fender flare comprises a first end and a second end, the fender portion and the mounting plate portion connected at least at the first end or the second end.

In some configurations, the fender flare is formed of a steel, an aluminum, or a plastic material.

In some configurations, the fender flare is formed of a plurality of steel pieces coupled together.

An aspect of the present disclosure involves a step assembly for a vehicle body including a mounting plate and an outer shell having a flattened step portion. The outer shell is supported by a plurality of inner struts. One or more mounting extensions extend outwardly from the outer shell to connect the step with a vehicle. The mounting plate includes a plurality of projections and flanges for mounting with the vehicle.

An aspect of the present disclosure involves a modular front or rear bumper having a central region. The central region has first and second ends being optionally mountable to either a pair of peripheral extensions or a pair of end caps. The peripheral extensions have a first aperture and mounting locations for mounting a forward-facing light kit. The end caps have a second aperture and mounting locations for mounting a sideways facing light kit.

BRIEF DESCRIPTION OF THE DRAWINGS

FIG. 37 is a perspective view of an attachment bracket for use in any of the above fender flares.

DETAILED DESCRIPTION

Figure 1A:
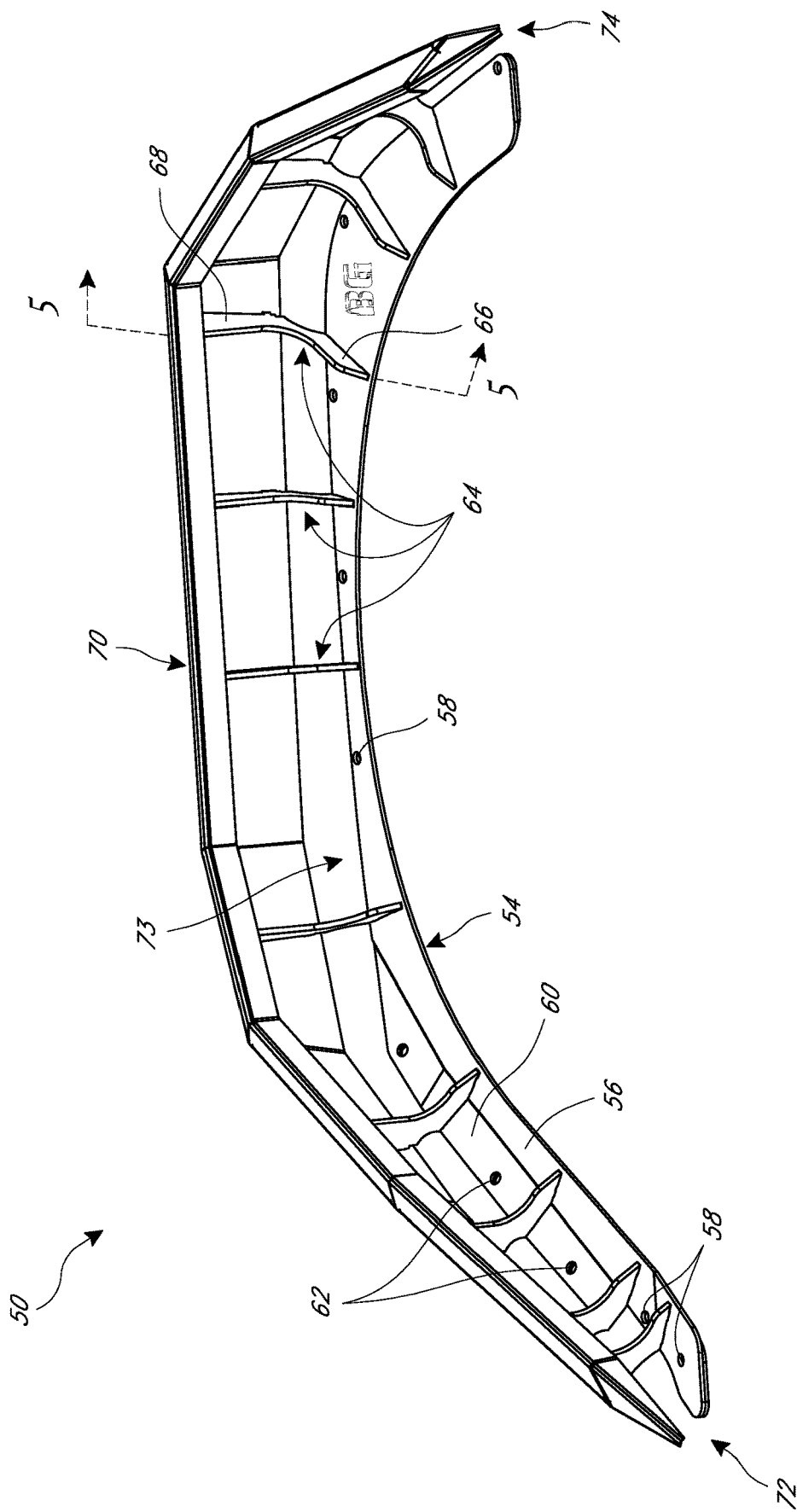
FIG. 1A is a bottom perspective view of a fender flare.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar importance.

FIGS. 1 through 12 illustrate several embodiments of fender flares. As illustrated, the fender flares in FIGS. 1 through 12 are designed specifically for assembly with Jeep Wrangler vehicles at either the front or rear wheel wells. Mirror images of the fender flares can be applied to driver and passenger sides of the vehicles, respectively. Although the fender flares are disclosed as matching the contours of certain models of the Jeep Wrangler (e.g., JK and JL models), the concepts embodied in the disclosed fender flares can also be applied to other vehicle types by one of ordinary skill in the art in view of this description.

Figure 1B:
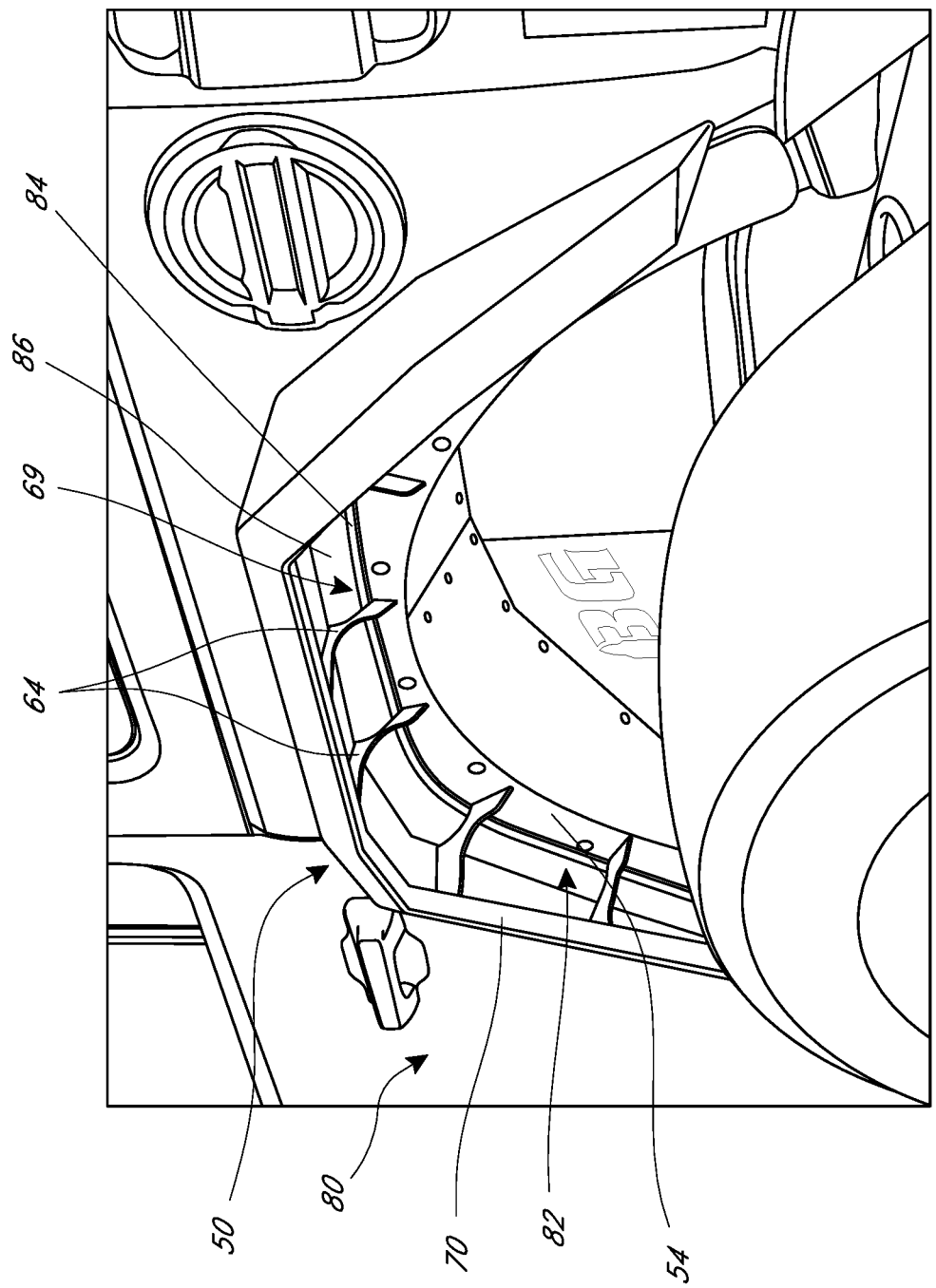
FIG. 1B shows an embodiment of the fender flare of FIG. 1A mounted on a Jeep Wrangler vehicle.
Figure 2:
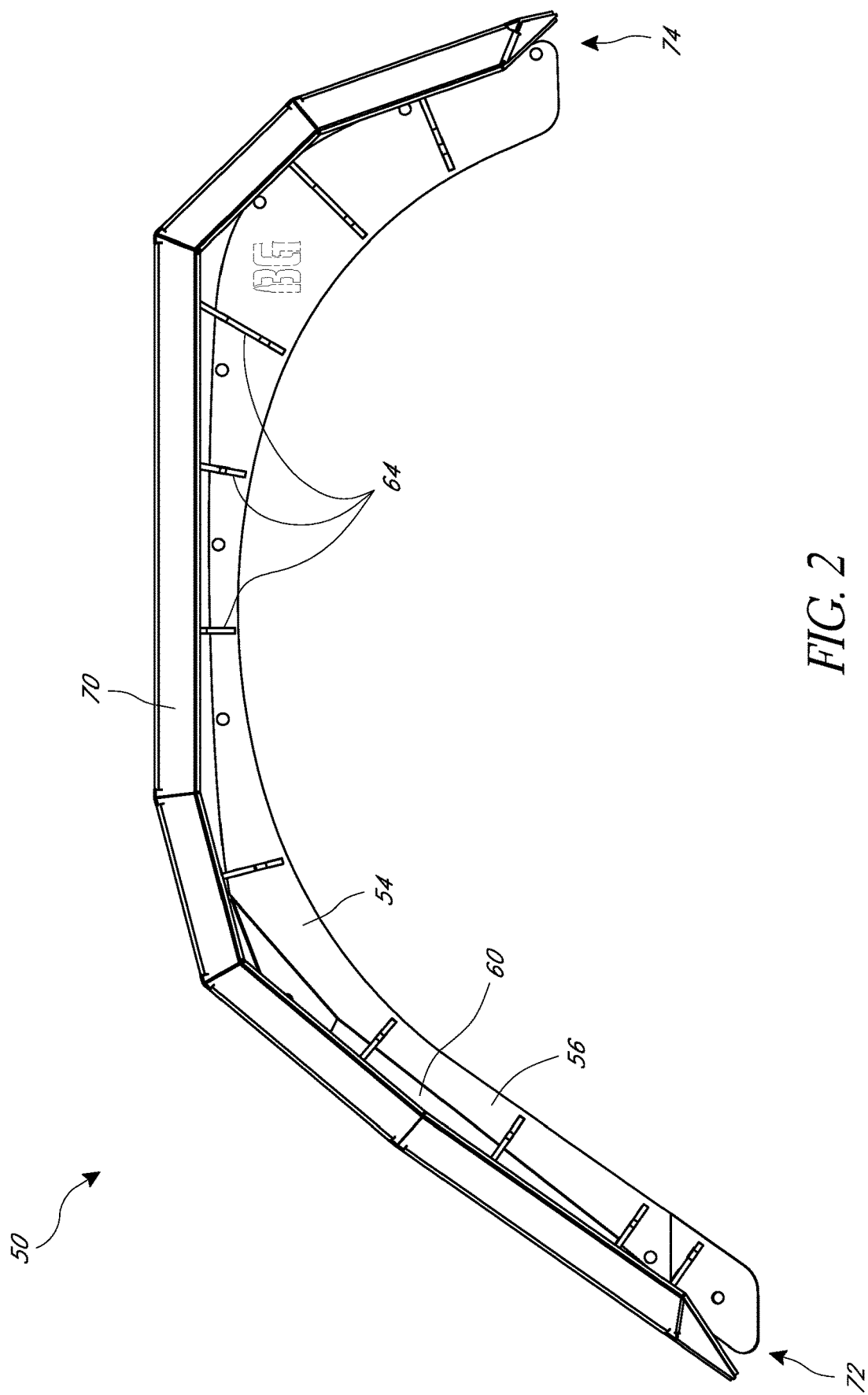
FIG. 2 is a front elevation view of the fender flare of FIG. 1.

FIGS. 1A and 1B illustrate a fender flare 50. The fender flare 50 has a mounting plate 54 and a fender portion 70. A plurality of strut plates 64 can extend between the fender portion 70 and the mounting plate portion 54. In some configurations, the fender portion 70 can be at least partially offset from the mounting plate portion 54 by the plurality of strut plates 64. With reference to FIG. 1B, the fender flare 50 can be assembled on a wheel well 82 of a vehicle body 80. In some vehicle bodies 80, the wheel well 82 has a generally arc-shaped lip 84. The arc-shaped lip 84 can be generally used to attach the stock fender flare of the vehicle 80. The fender flare 50 can be attached in place of the stock fender flare. The mounting plate portion 54 can be attached to the generally arc-shaped lip 84 (e.g., by one or more mechanical fasteners).

In certain vehicles, the arc-shaped lip 84 can also include a rounded ridge portion 86 that offsets a mounting flange of the wheel well 82 from the rest of the vehicle body 80. The rounded ridge 86 can limit the options for assembling fender flares that are larger than the stock fender flares. The illustrated fender flare 50, however, provides the advantage of not being limited by the rounded ridge portion 86 of the wheel well 82.

The mounting plate portion 54 can be attached to the mounting flange of the arc-shaped lip 84. The plurality of strut plates 64 can extend up and/or out or around the rounded ridge 86 the wheel well 82. The strut plates 64 can thus support the fender portion 70 at a location that is above and/or outside of wheel well 82. In some implementations, the strut plates 64 can support the fender portion 70, which can be larger than, smaller than and/or differently-shaped than the stock fender flares. As shown, for example in FIG. 5, one or more of (e.g., each of) the strut plates 64 can include a cutout region 69 that positions the fender portion 70 outward of the rounded ridge 86 of the wheel well 82. The cutout portion 69 can be shaped so that the strut plates extend outwardly away from the body 80 of the vehicle and/or extend upwardly above the wheel well 82 (e.g., around the rounded ridge 86).

The mounting plate portion 54 can comprise a general arc shape. The mounting portion 54 can include one or more flat portions 56. The arc shape and/or the flat portions 56 can correspond generally to the wheel well 82 of the vehicle body 80 to which the fender flare 50 is designed to mount. The mounting plate portion 54 can comprise one or more apertures 58. The apertures 58 can extend through the flat portions 56.

The apertures 58 are designed to accommodate one or more bolts or other mechanical fasteners to attach the fender flare 50 to the vehicle body 80. In certain implementations, the apertures 58 can be recessed to lower the profile of the bolts or screws extending through the apertures 58. In certain implementations, the apertures 58 can correspond to apertures or mounting locations on the vehicle body 80. For example, the vehicle body 80 can include a stock fender that is attached at specific locations with mechanical fasteners. When the stock fender is removed, some or all of these apertures of the body 80 can be available as mounting locations for the flat portion 56.

The mounting plate portion 54 can comprise one or more curved or angled portions 60. The angled portions 60 can be attached to the flat portion 56 at an angle. The angled portions 60 can comprise one or more apertures 62. The apertures 62 can be similar to the apertures 58. The apertures 62 can correspond to apertures on the body 80 of the vehicle and/or can be used to attach the mounting plate portion 54 to the vehicle.

The fender flare 50 can comprise a plurality of strut plates 64. The strut plates 64 can extend between and/or connect the mounting plate portion 54 and the fender portion 70. The strut plates 64 can connect to one or both of the flat portion 56 or the angled portion 60 of the mounting plate portion 54.

The strut plates 64 can be or include flat plates. The strut plates 64 can extend perpendicularly from the mounting plate portion 54 and/or the fender portion 70. In other implementations, the strut plates 64 can extend at an oblique angle relative to the mounting plate portion 54.

A first end 66 of one of the strut plates 64 can connect to the mounting plate portion 54. In some implementations, the first end 66 can be mechanically coupled and/or welded to the mounting plate portion 54. A second end 68 of the strut plate 64 can be mechanically coupled and/or welded to the fender portion 70. The strut plates 64 can have tabs that are received within corresponding slots of the mounting plate portion 54 and/or fender portion 70. In certain implementations, the angle between the first and second ends, 66, 68 (and portions of the mounting plate portion 54 and fender portion 70) can be between 60 degrees and 120 degrees. In one implementation, the angle is between 85 degrees and 95 degrees. In another implementation, the angle is 90 degrees.

Each of the strut plates 64 can be a generally flat or planar metal plate. The strut plates 64 can be cut or stamped from a solid sheet of metallic material such as steel. In one exemplary process, the strut plates 64 are cut from steel sheets using a laser or water jet machine. Each of the plurality of the strut plates 64 can have the same general structure as the other strut plates 64. However, the struts 64 can also take on other shapes or arrangements, such as tubular or other non-flat shapes.

Figure 6:
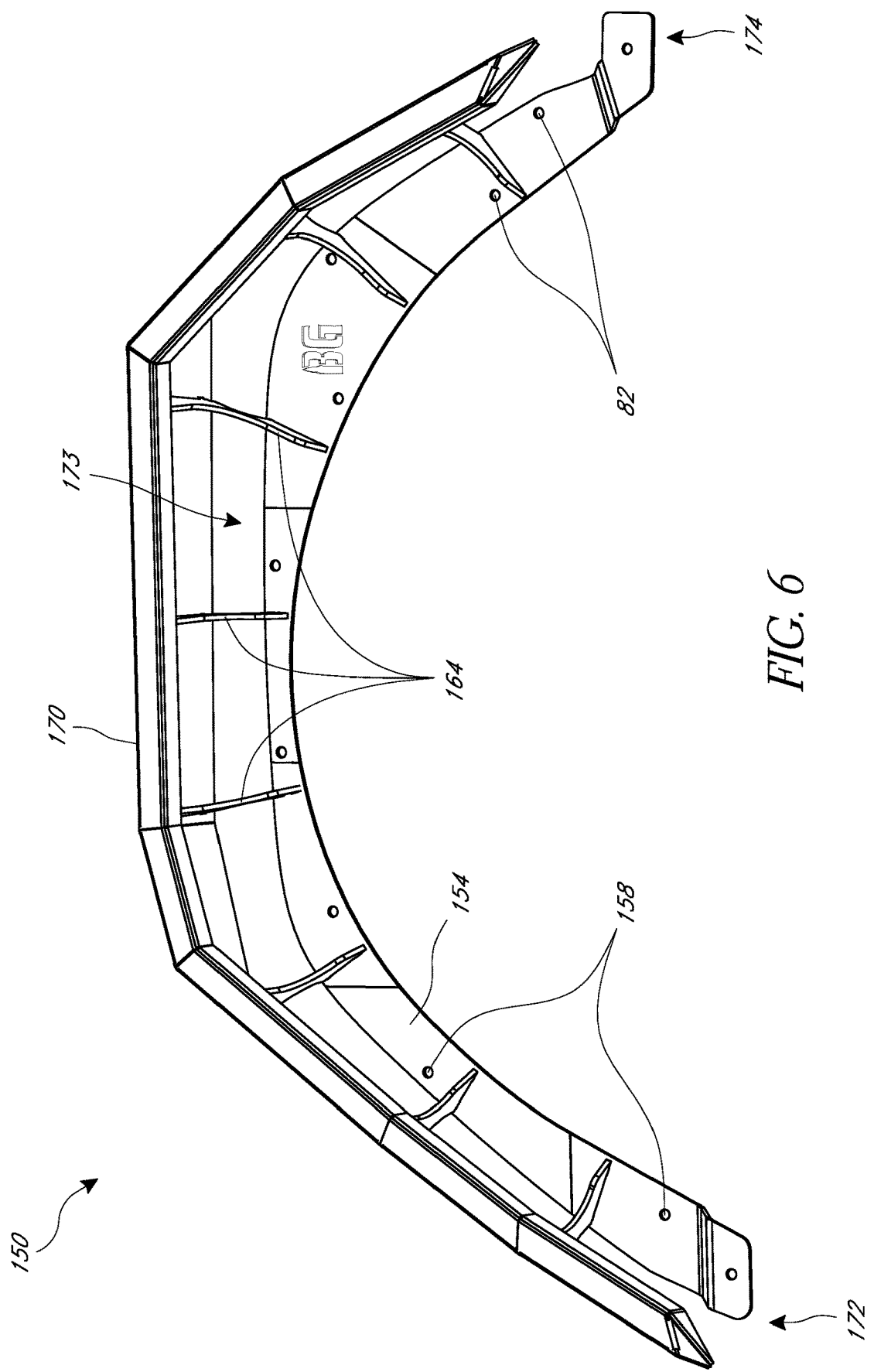
FIG. 6 is a perspective view of another embodiment of the fender flare.
Figure 7:
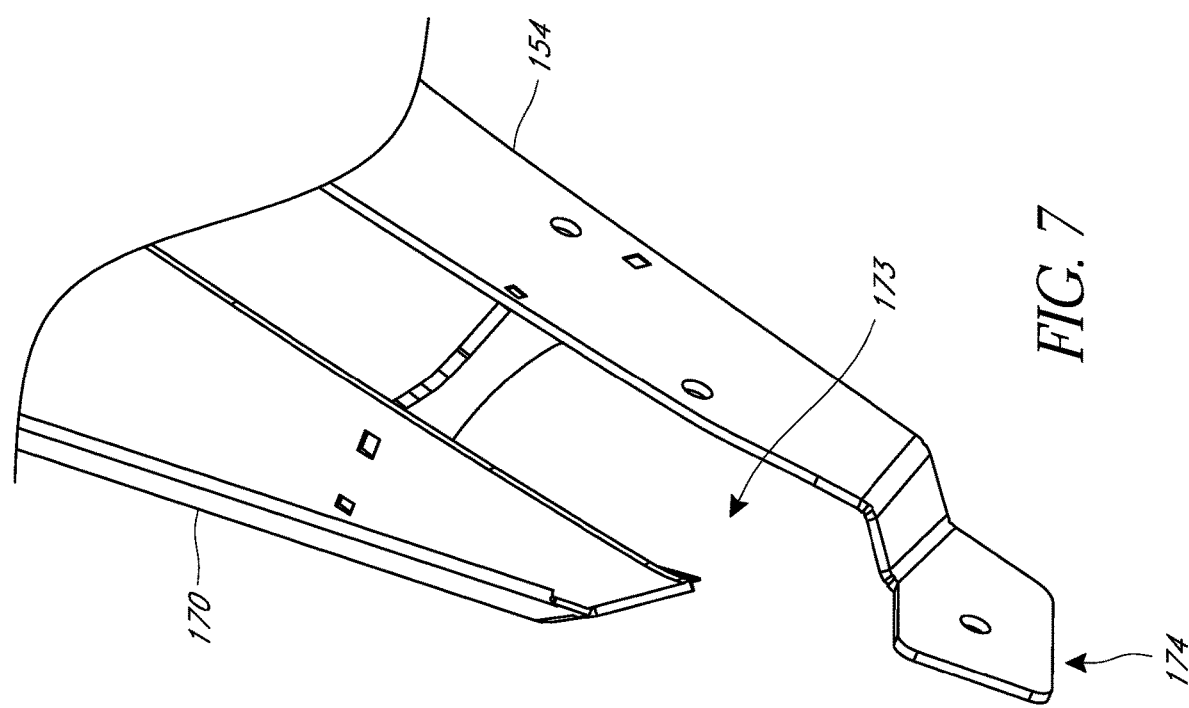
FIG. 7 is a detailed view of one end of the fender flare of FIG. 6.
Figure 10:
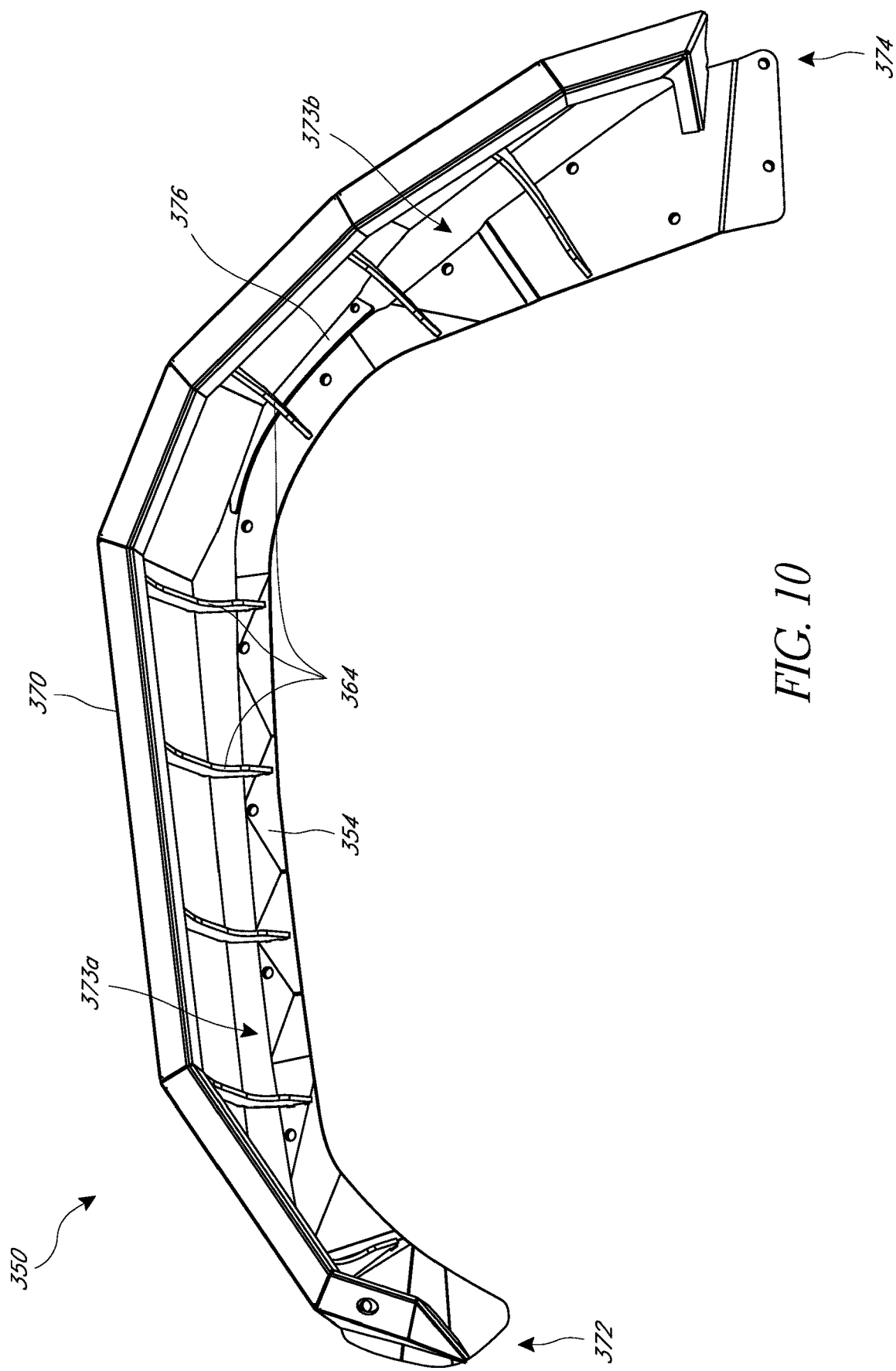
FIG. 10 is a front perspective view of another embodiment of a fender flare.
Figure 11:
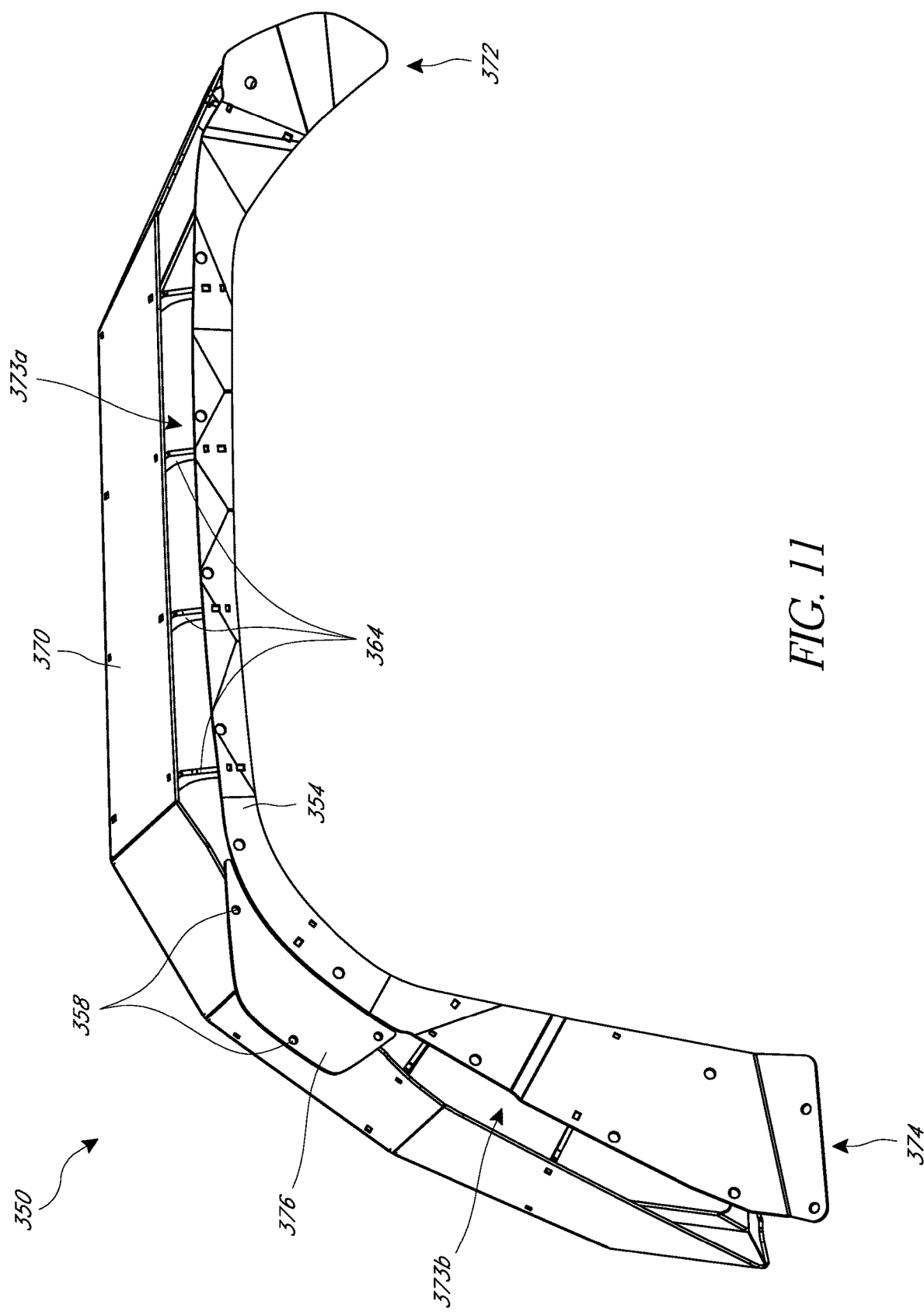
FIG. 11 is a rear perspective view of the fender flare shown in FIG. 10.
Figure 12:
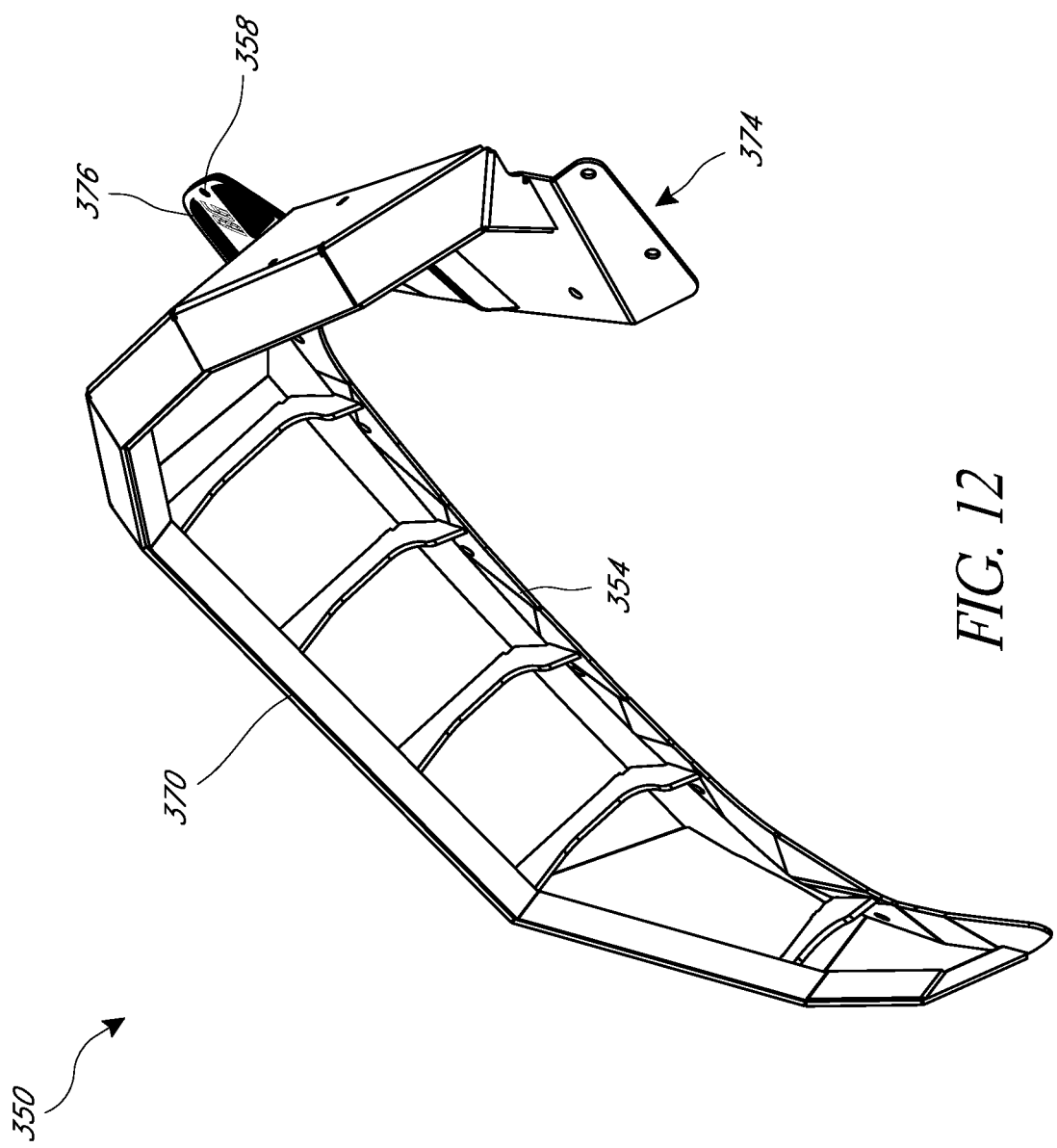
FIG. 12 is a detailed view of an end portion of the fender flare of FIG. 10.
Figure 13:
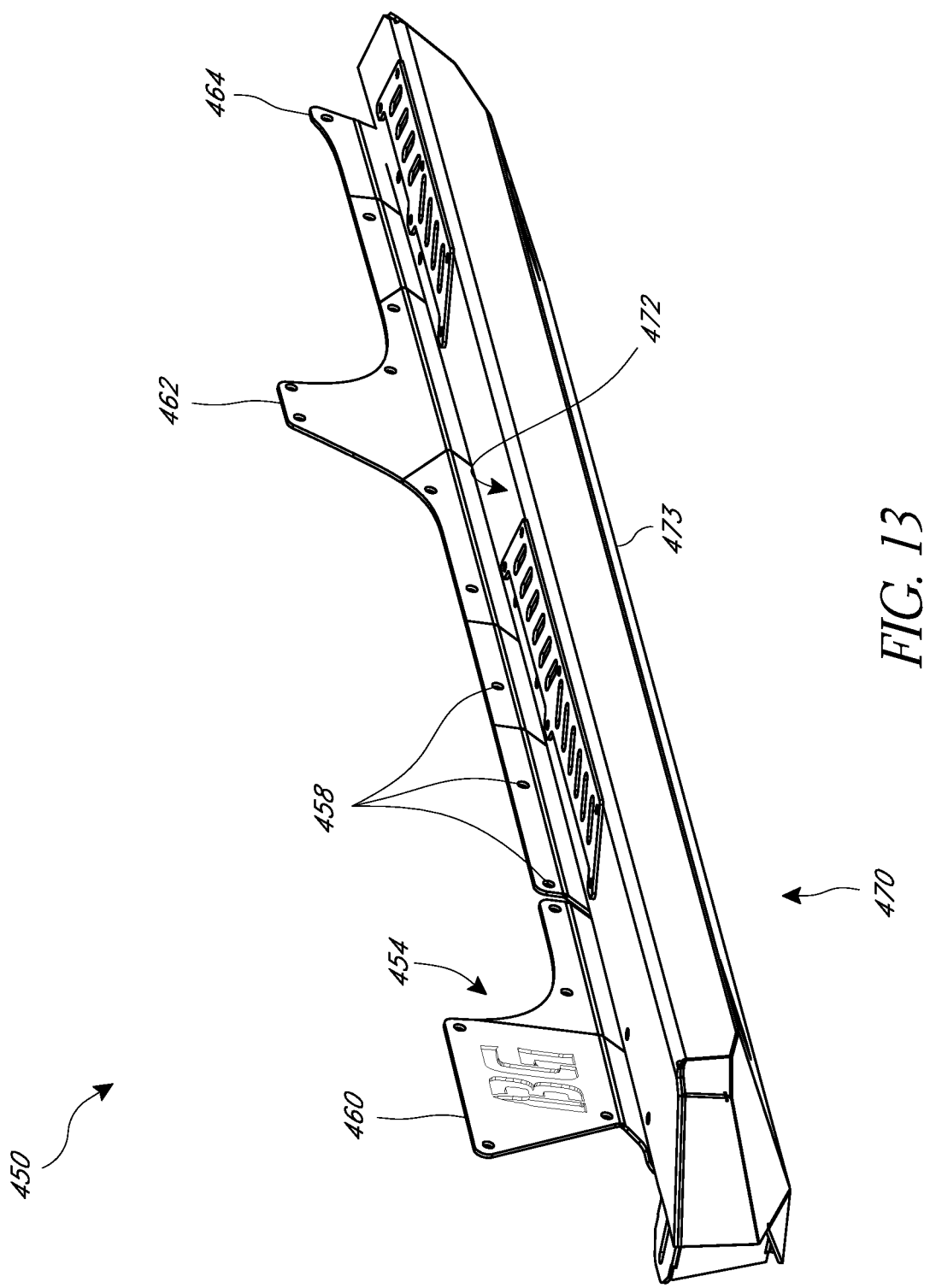
FIG. 13 is a front perspective view of a step assembly for a vehicle.
Figure 14:
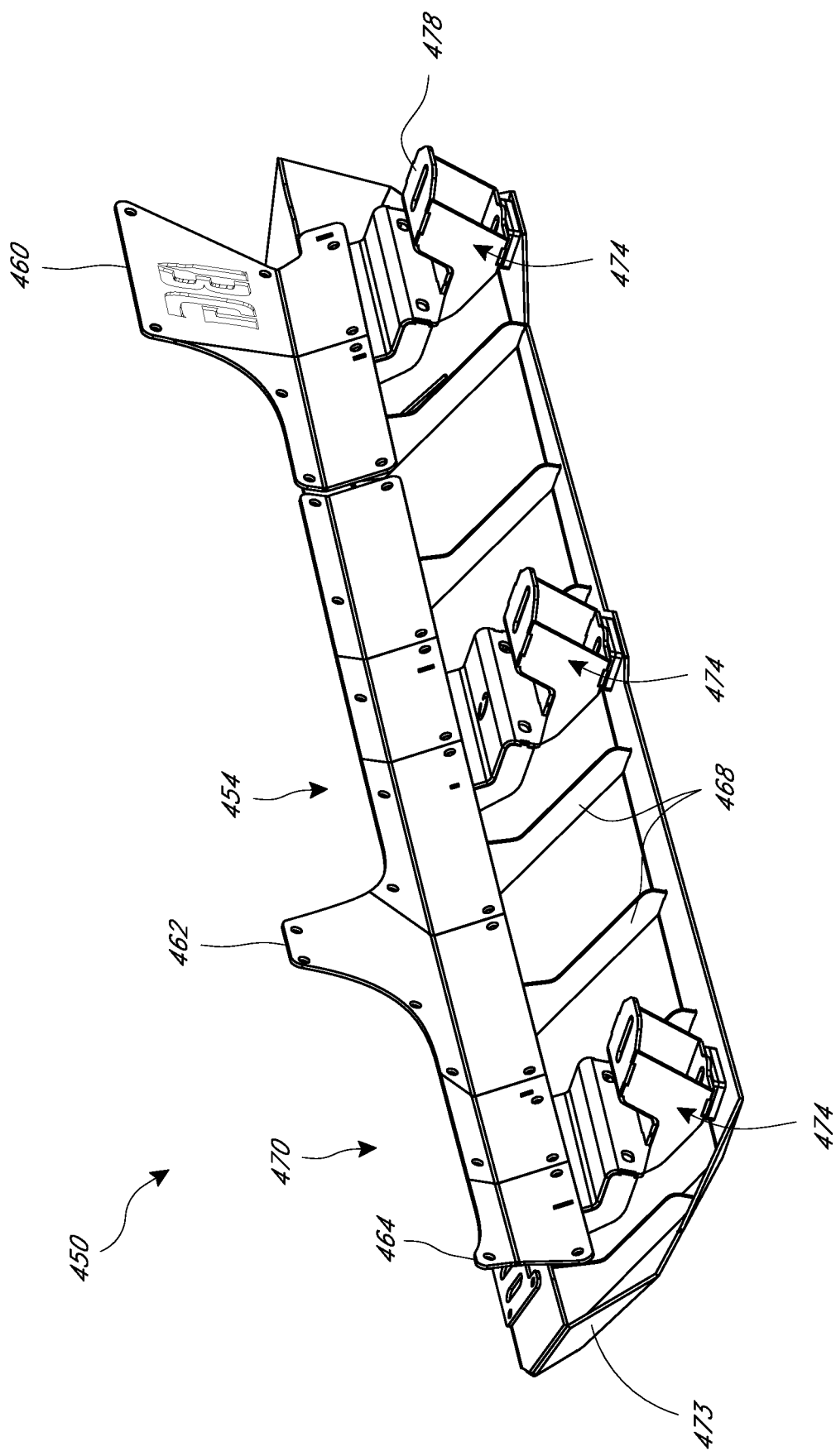
FIG. 14 is a rear perspective view of the step assembly shown in FIG. 13.

The strut plates 64 can support the fender portion 70 relative to the mounting plate portion 54. In some configurations, the strut plates 64 can offset the fender portion 70 away from the mounting plate portion 54. One or all of the strut plates 64 can include the cutout 69. The cutout 69 can be configured such that the strut plates 64 form a gap 73 between the mounting plate portion 54 and the fender portion 70. The gap 73 can lighten the overall weight of the fender flare 50 without compromising its utility. Moreover, the gap 73 can be used to accommodate the geometry of the wheel wells of the body 80 of the vehicle. The gap 73 can also inhibit or prevent water from pooling on the fender portion 70 adjacent the vehicle body 80 and instead can allow water to pass between the fender portion 70 and the vehicle body 80. The gap 73 preferably extends along a substantial entirety of a length of the fender flare 50. In some configurations, the gap 73 extends along an entirety of the length of the fender flare 50, as illustrated in FIGS. 1A and 6. However, in other arrangements, portions (e.g., end portions) of the fender portion 70 can be connected to the mounting plate portion 54, as illustrated in FIGS. 10 and 11. In other configurations, the gap 73 can be omitted and a portion or an entirety of the edge of the fender portion 70 can abut or connect to the mounting plate portion 54.

The fender portion 70 can be a generally arc-shaped surface that extends over at least a portion of a wheel or wheel well 82 of the vehicle body 80. The fender portion 70 can extend laterally outwardly relative to the mounting plate portion 70. The fender portion 70 can include one or more curved or flat portions depending on the style of the fender portion 70 and the method of manufacture. In one implementation, the fender portion 70 is formed from a single sheet of metal (e.g., steel or aluminum).

In certain implementations, the fender flare 50 can be formed entirely of the same material. The material of the fender flare 50 can be any metallic material or plastic suitable for use as a fender flare. In certain implementations the fender flare 50 is made from steel, aluminum, or a durable plastic.

The fender flare 50 can include a first end 72 and a second end 74. At the first end 72 the fender portion 70 can be offset from the mounting plate portion 54, as described above. In other implementations, also as described above, the fender portion 70 can be attached to the mounting plate portion 54 at the first end 72 and/or at the second end 74. The fender portion 70 can be attached or offset from the mounting plate portion 54. Thus, in some embodiments the gap 73 can extend the entire length of the arcs formed by the mounting plate portion 54 and the fender portion 70.

Figure 3:
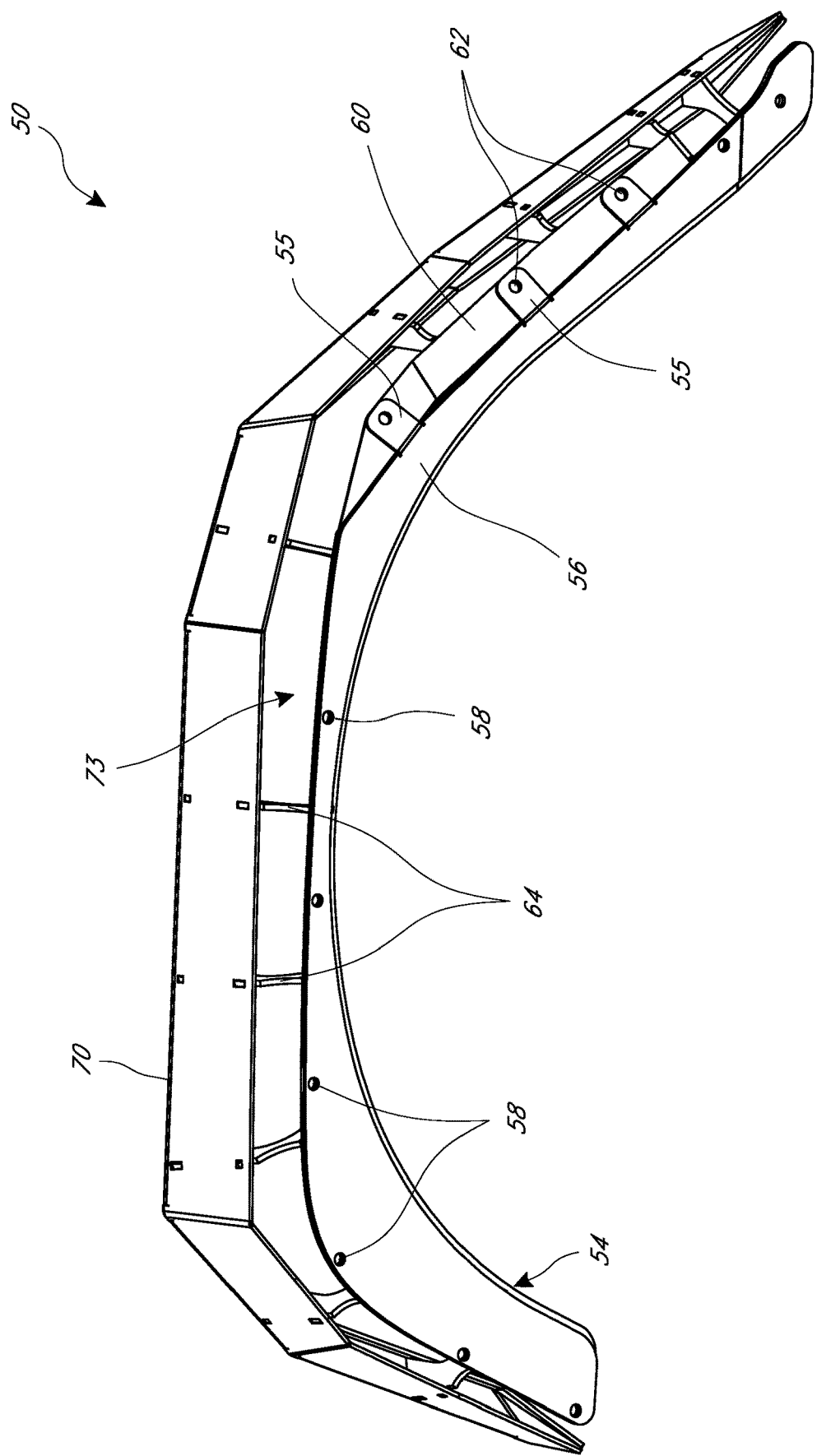
FIG. 3 is a top perspective view of the fender flare of FIG. 1.

As shown in FIG. 3, the mounting plate portion 54 can have one or more reinforced sections or tabs 55. The reinforced sections or tabs 55 can provide additional support for the apertures 58, 62 and/or the junctions between the flat portion 56 and the angled portion 60.

Figure 4:
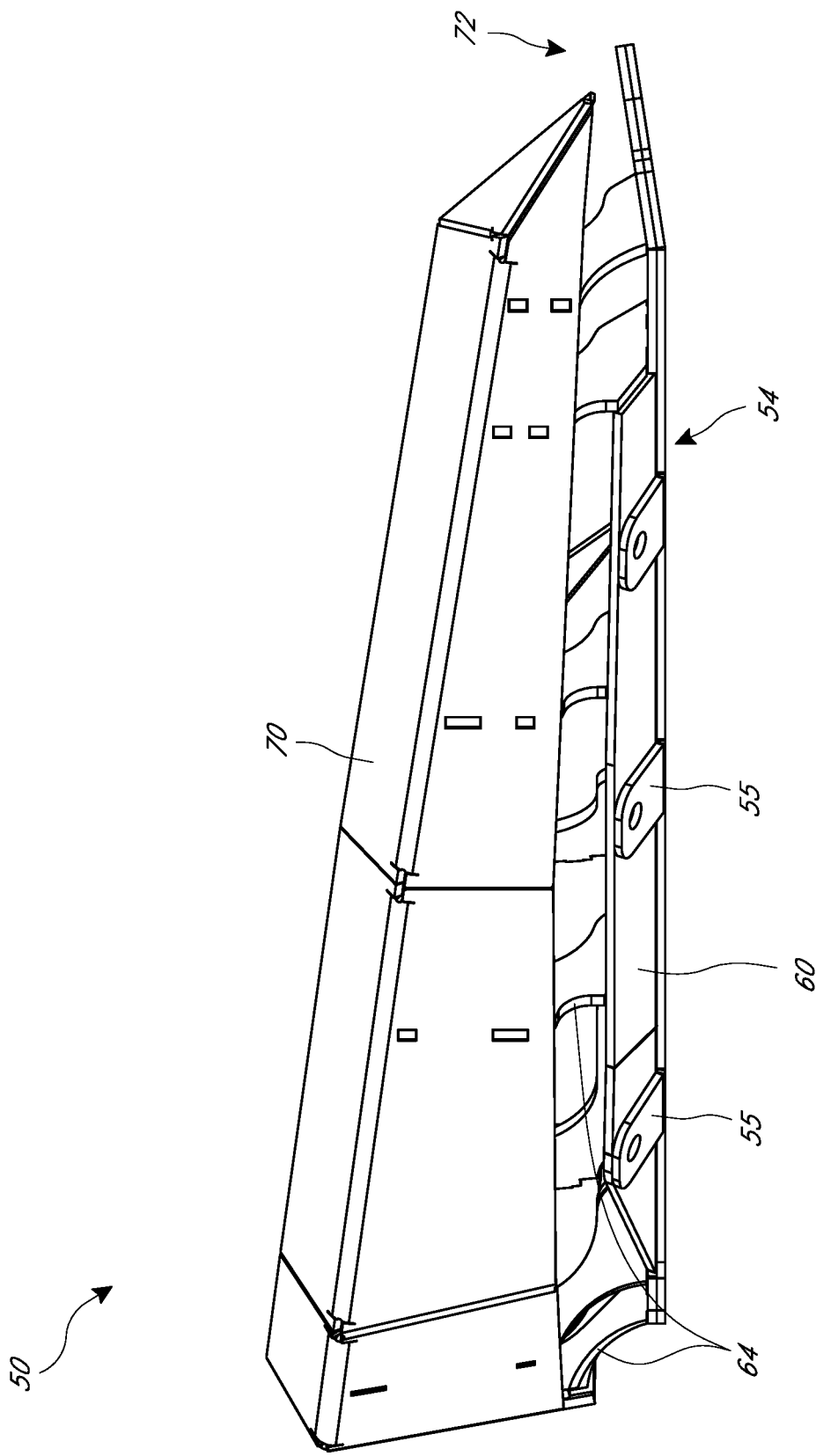
FIG. 4 is a front view of the fender flare of FIG. 1.

As shown in FIG. 4, in certain implementations, the fender portion 70 can be generally tapered as it extends outwardly towards the first and second ends 72, 74. The mounting plate portion 54 can include one or more angled portions 53 at the first end or second end 72, 74. The shape of the mounting plate portion 54 can be customized based on the vehicle body 80.

Figure 5:
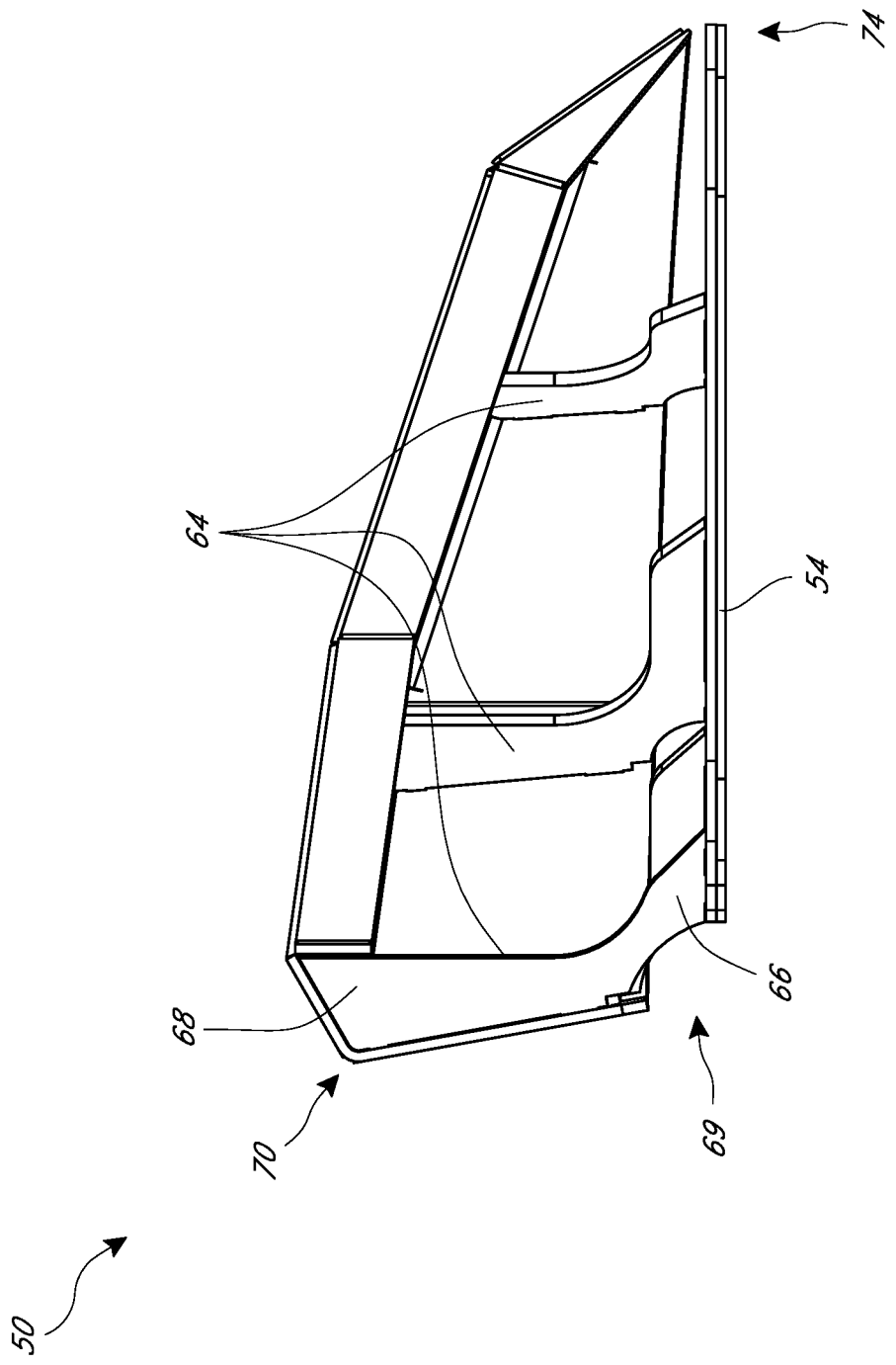
FIG. 5 is a section view taken along the line 5-5 in FIG. 1A.

FIG. 5 illustrates the strut plate 64 having a first end 66 attached to the mounting plate portion 54. The second end 68 of the strut plate 64 can attach to the fender portion 70. In certain implementations the second end 68 can include one or more angled faces. The fender portion 70 can include an outer flange portion that is supported by the second end 68 of the strut plate 64 and a return flange portion that extends back towards the mounting plate portion 54. FIG. 5 illustrates the cutout region 69 of one of the struts 64.

FIG. 6 illustrates another embodiment of a fender flare 150. The fender flare 150 can include the same features as described in the fender flare 50. Accordingly, the reference numbers are the same for the same or corresponding structures with the addition of a "1" before the reference number. The fender flare 150 can include a mounting plate portion 154, a fender portion 170 and a plurality of strut plates 164. The plurality of strut plates 164 can attach on one end to the mounting plate portion 154 and on a second end to the fender portion 170 to provide support thereto.

As illustrated in FIG. 6, the mounting plate portion 154 can have various profiles and can include flat or curved regions that generally form an arc to match the wheel well 82 of the vehicle body 80. The embodiment shown in FIG. 6, in particular, is designed for a Jeep Wrangler JL. The fender flare 150 can include a plurality of apertures 158 for attaching the fender flare 150 to the vehicle body 80. The fender flare 150 can include first and second ends 172, 174. A gap 173 can extend partially or fully along a length of the fender flare 150 between the fender portion 170 and the mounting plate portion 154. The plurality of strut plates 164 can provide this offset outwardly and/or upwardly from the mounting plate portion 154. In certain implementations, the first and/or second ends 172, 174 of the fender flare 150 on the mounting plate portion 154 can be dog-legged or bent to match the contours of the wheel well body 82.

Figure 8:
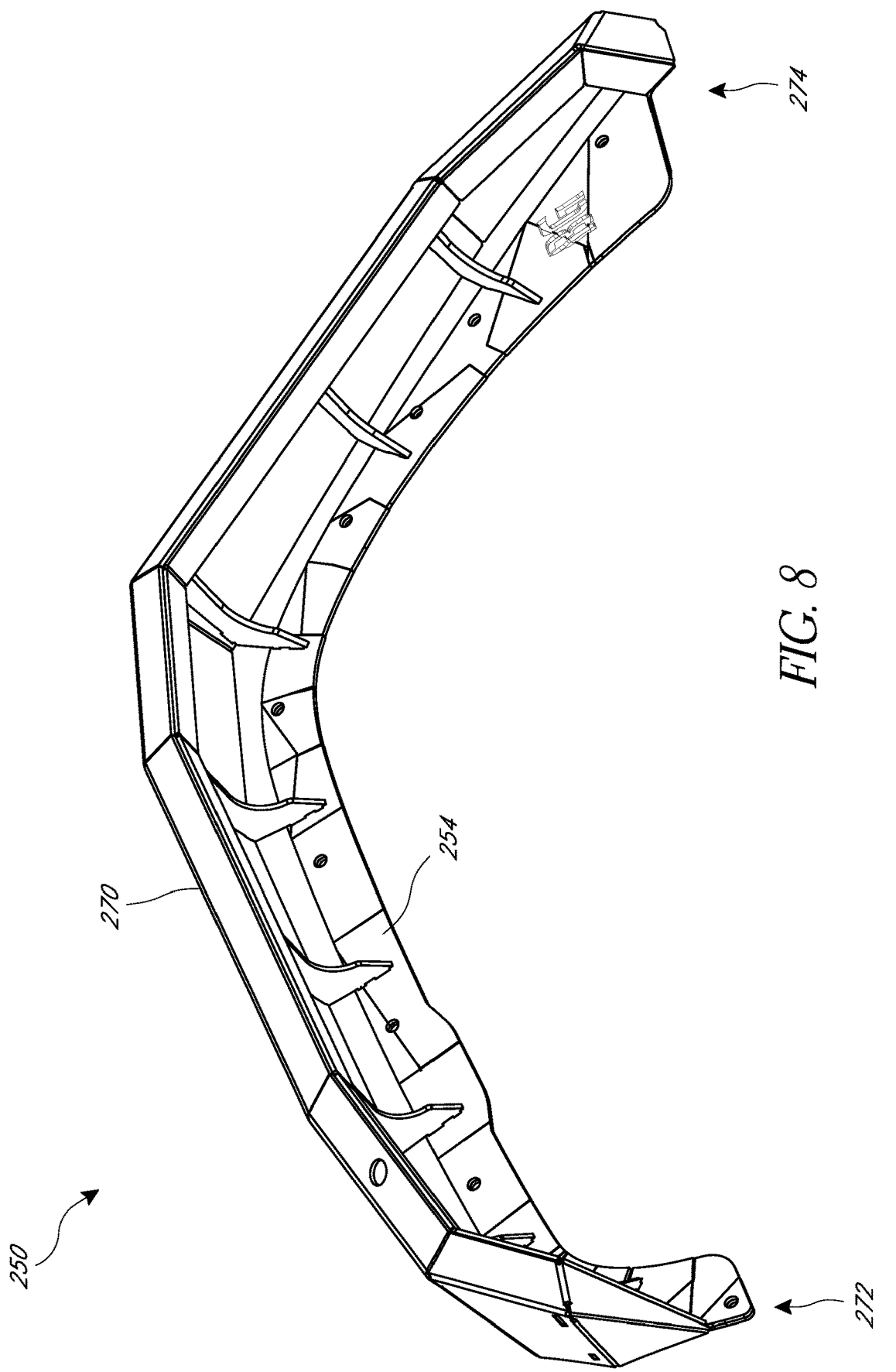
FIG. 8 is a front perspective view of another embodiment of a fender flare.
Figure 9:
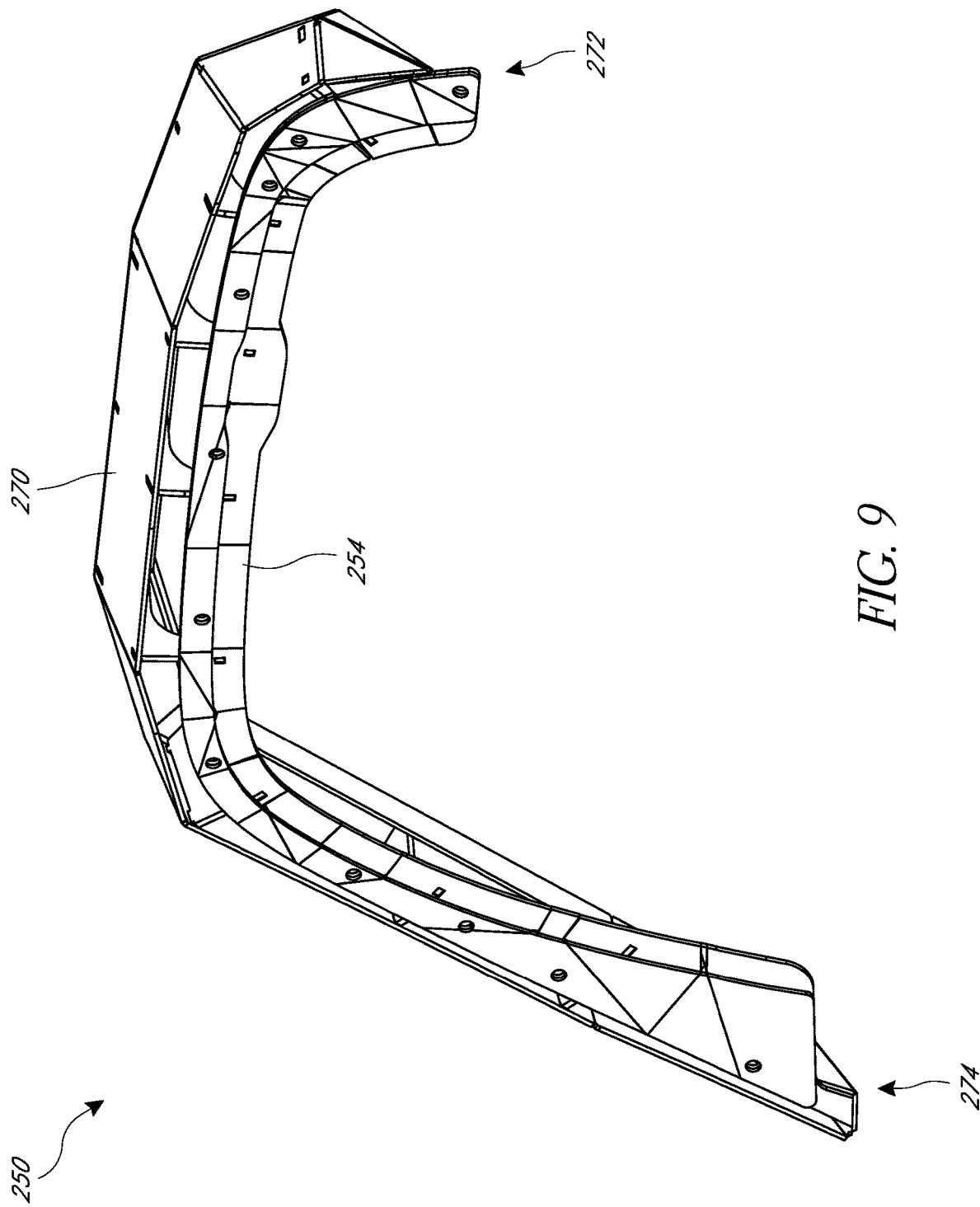
FIG. 9 is a rear perspective view of the fender flare shown in FIG. 8.

FIGS. 8 and 9 illustrate another embodiment of a fender flare 250. The fender flare 250 can have similar structures to the previously described fender flares 50, 150. Accordingly, the reference numbers can be the same for similar or corresponding structures with the addition of the number "2" added to the reference number. The fender flare 250 can include a fender portion 270 and a mounting plate portion 254. As illustrated in this embodiment, the fender flare 250 can be for a front wheel well of a Jeep Wrangler JK although it is not limited to this particular vehicle. The mounting plate portion 254 can be attached to the fender portion 270 at a first end 272 and at a second end 274. The fender portion 270 can attach to the mounting plate portion 254 (e.g. by welding or other mechanical attachment with the mounting plate portion 254).

FIGS. 10 and 11 show a front wheel fender flare 350 for a Jeep Wrangler JL. The fender flare 350 can have a similar structure to the fender flares 50, 150, 250. Accordingly, the same or corresponding structures have the same reference number with the addition of the number "3" added thereto. The fender flare 350 can include a fender portion 370, a mounting plate portion 354 and a plurality of strut plates 364. The strut plates 364 of the fender flare 350 can include a first end 372 and second end 374. In this embodiment of the fender flares 350, the fender portion 370 attaches to the mounting plate portion 354 at the first end 372, but optionally not at the second end 374.

In another variation, the mounting plate portion 354 can include an intermediate plate 376 between the first end 372 and the second end 374. The intermediate plate 376 can be or include a plate or extension of the mounting plate portion 354 and/or the fender portion 370. Thus, the fender flare 350 can include a first gap portion 373a and a second gap portion 373b. The first and second gaps 373a, 373b can be positioned on either side of the intermediate plate 376. The first and second gaps 373a, 373b can be contiguous or can be separate from one another. In certain implementations the intermediate plate 376 can extend upward or beyond the fender portion 370. The intermediate plate 376 can extend upwards and above and include one or more apertures 358 for attaching with the wheel well body 82.

FIGS. 13 through 17 illustrate an embodiment of a step or slider assembly 450 (hereinafter "step"). The step 450 can be attached to a vehicle such as below one or more doors on a side of a vehicle. The step 450 can include a mounting portion, which can be in the form of a body cladding or mounting plate 454, for attaching to the body of a vehicle and a step portion 470. The step portion 470 can include an upper flattened step region 472 on which a person can step to enter the vehicle using the step 450. Certain vehicles, such as the Jeep Wrangler come with a stock step. The stock step is generally formed out of a plastic material and it can be desirable for this stock step to be replaced by a more robust and/or differently-shaped step, such as the step 450.

The mounting plate portion 454 can attach to the body of the vehicle. The mounting plate portion 454 can include a plurality of apertures 458. The apertures 458 can align with existing apertures provided on the body 80 of the vehicle. In other implementations, apertures or holes can be added into the body of the vehicle or customized into the mounting portion 454 of the step 450. The mounting portion 454 can include one or more extensions such as the projections 460, 462 and/or 464. The projections 460, 462, 464 can include some of the plurality of apertures 458. The projections 460, 462, 464 allow for additional connection between the step 450 and the body of the vehicle.

The mounting portion 454 can be formed from a robust material such as steel, aluminum or plastic material depending on the desired durability and applications of the step 450. The mounting portion 454 can include multiple portions that are separate from one another, as shown for example, in FIG. 17. The projection 460 is located on one portion of the mounting portion 454 and the projections 462 and 464 are located on the other portion of the mounting portion 454.

The step portion 470 can be generally formed as an outer shell 473. The interior of the outer shell 473 can be supported by a plurality of support plates or struts 468. The struts 468 can connect between a bottom area of the outer shell 473 and the planar step region 472. The plurality of struts 468 can be generally flat and formed of the same material as the outer shell 473. The mounting plate 454 can attach directly to the one or more of the plurality of struts 468, such as those described above with respect to struts of the fender flares.

The step 450 can be attached to the body 80 of the vehicle by one or more mounting extensions 474. The mounting extensions 474 extend from a rear of the step 450 on the opposite side of the step region 472. The mounting extensions 474 can attach to the body 80 and provide support to the step region 472 of the outer shell 473. The mounting extensions 474 can attach directly to the outer shell and/or to the plurality of struts 468. Each of the mounting extensions 474 can include a flange 478. The flange 478 can include an inner aperture or slot to provide for being connected to the body 80 of the vehicle. The mounting extensions 474 can be used in addition to the mounting plate 454 for attaching the step 450 to the vehicle. Such an arrangement eases the mounting process because the mounting extensions 474 and the mounting plate 454 can be separately attached to the vehicle. In some implementations, the mounting plate 454 can be optional and can be omitted if desired. However, in at least some implementations, the mounting plate 454 does provide additional strength and protects the body of the vehicle from damage.

Figure 15:
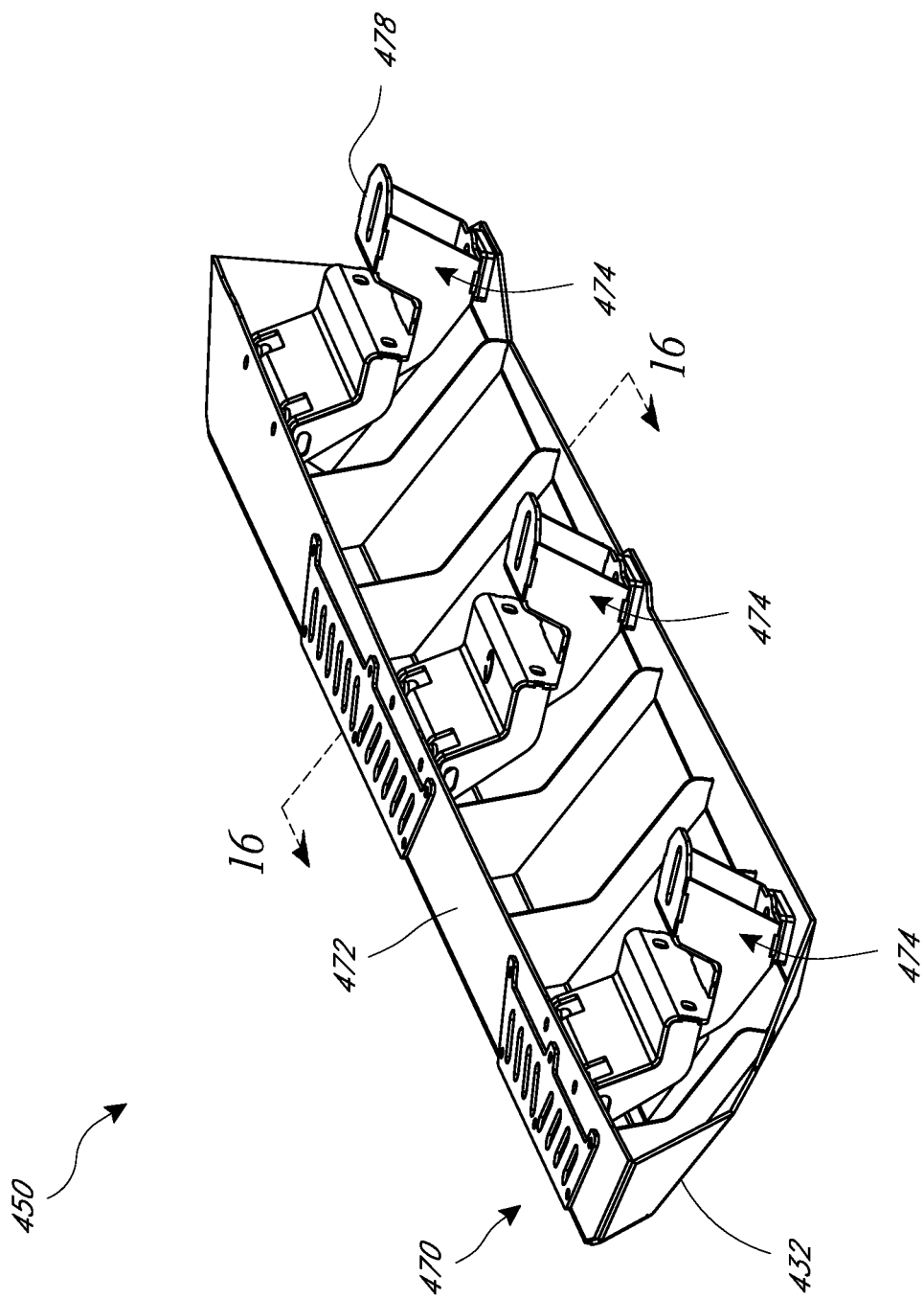
FIG. 15 is a rear perspective view of the step assembly shown in FIG. 13 having certain components removed for clarity.

FIG. 15 illustrates the step 450 with the mounting plate 454 removed for added clarity. The mounting extensions 474 can attach optionally directly to an underside of the step region 472 of the step 450. In this manner, the mounting extensions 474 can provide advantageous or optimum support directly to the region that is put under the most stress on the step 450.

Figure 16:
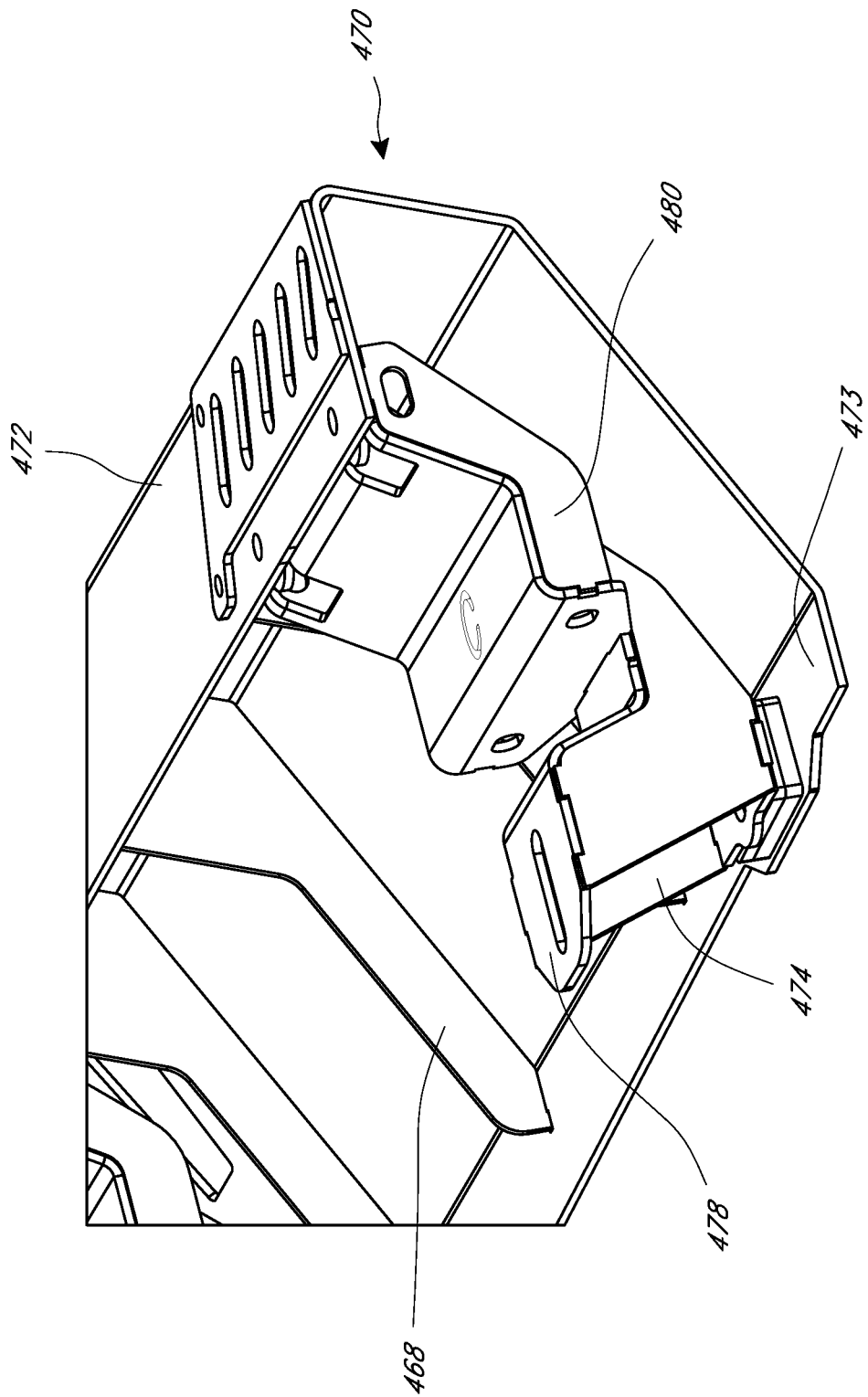
FIG. 16 is a section view taken along line 16-16 in FIG. 15.

FIG. 16 illustrates a close-up of one of the mounting extensions 474 mounted to the step region 472. The step region 472 can include a friction enhancing surface or step pad that enhances grip for a person's foot. The friction enhancing surface can be any type of rough or textured material that is attached to the step region 472 itself. In some implementations, texturing can be provided by depressions or cut-outs in the step region 472 or step pad.

The mounting extensions 474 can include the mounting flange 478 and/or a curved support region 480 extending between the mounting flange 478 and the attachment with the step portion 470 (such as at the flattened step region 472). In addition, the mounting extension 474 can attach to the lower portion of the shell 473. This arrangement provides support at the top and the bottom of the step 450.

Figure 17:
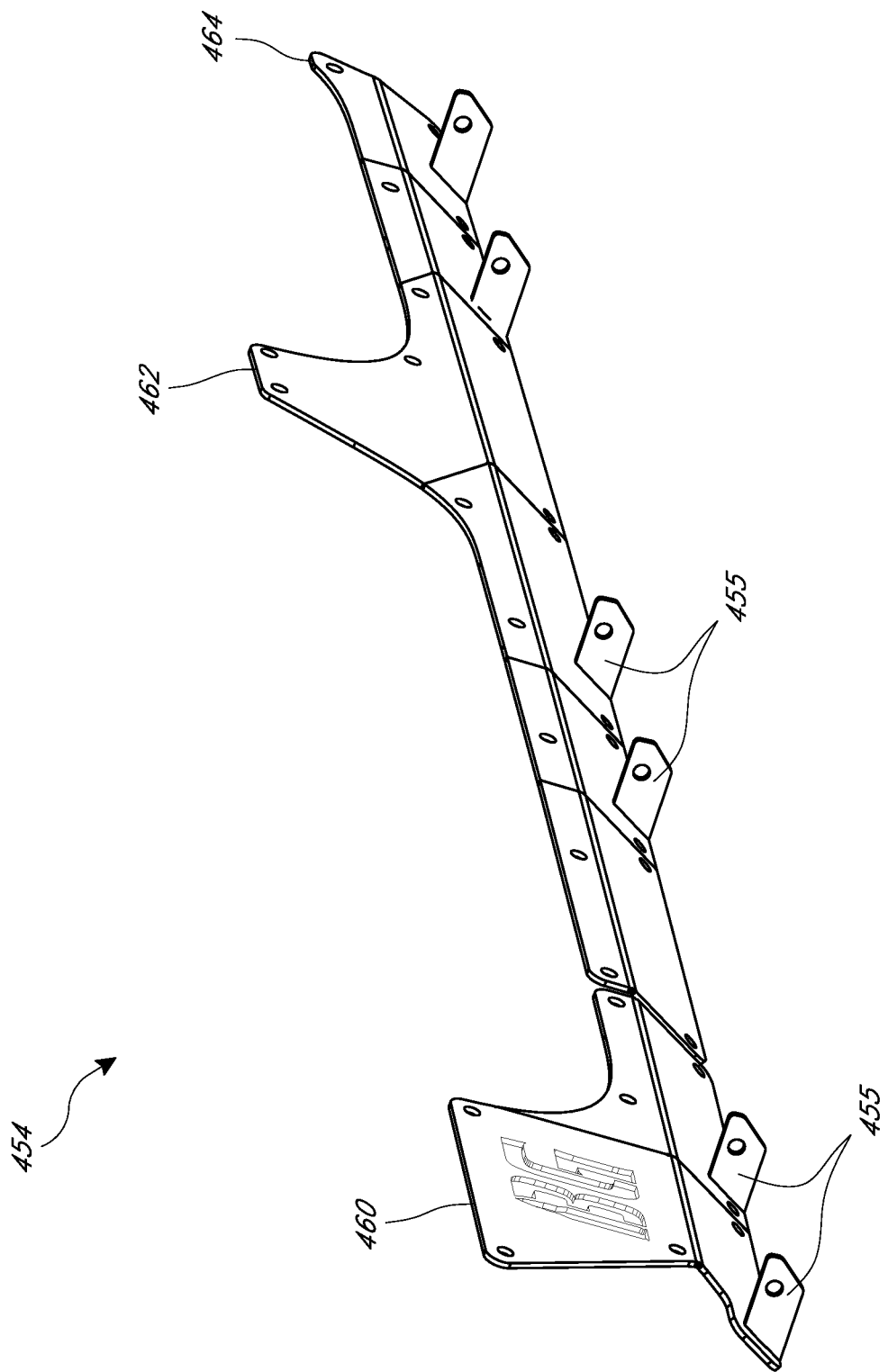
FIG. 17 is a perspective view of a mounting plate of the step assembly shown in FIG. 13.

FIG. 17 illustrates the mounting portion 454 alone. The mounting portion 454 can include a plurality of flanges 455. The flanges 455 can attach to the step portion 470. For example, the mounting flanges 455 can attach to the plurality of struts 468 and/or the mounting extensions 474. For example, the mounting flanges 455 can be configured to receive a bolt through an aperture to attach securely with the mounting extensions 474.

Figure 18:
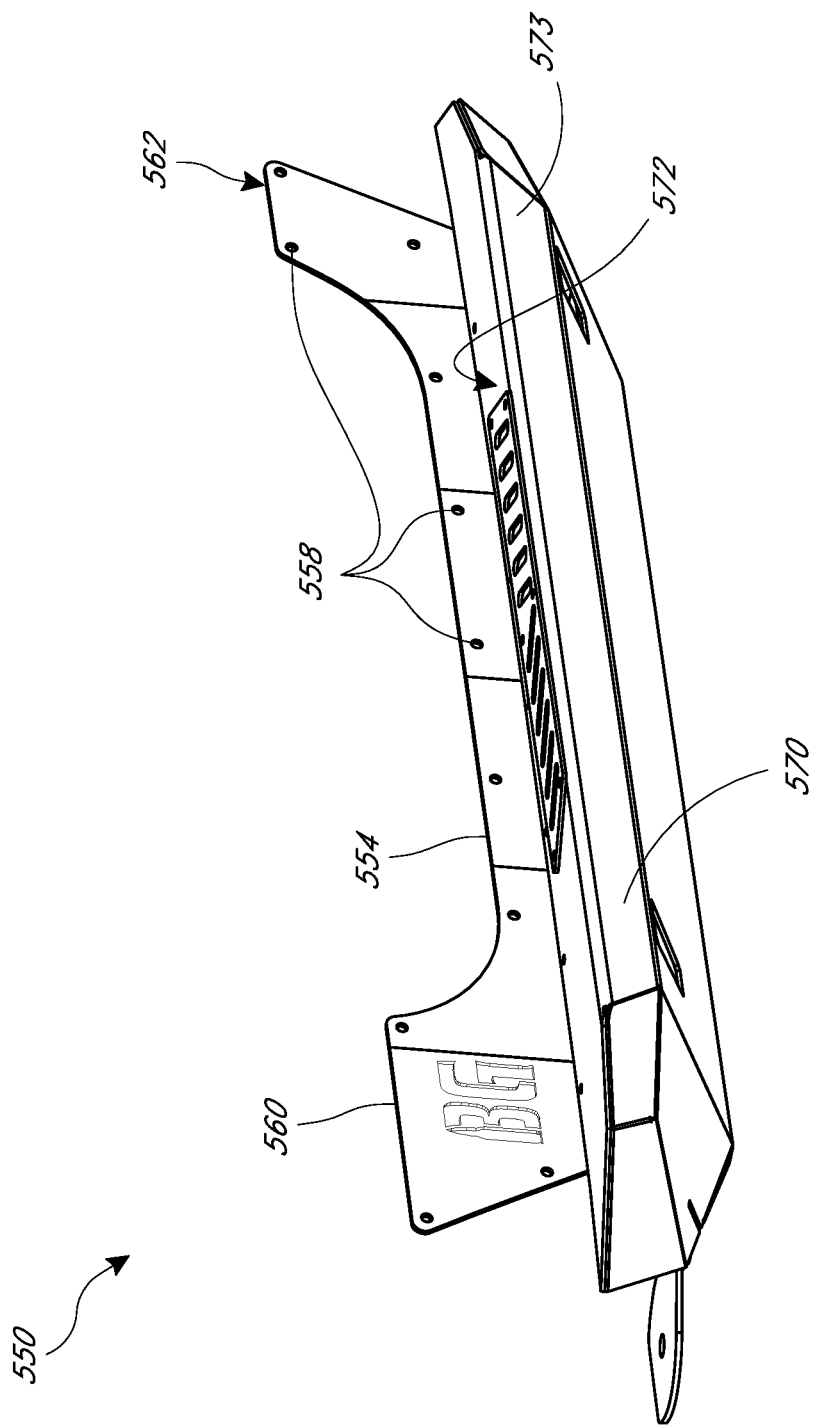
FIG. 18 is a front perspective view of another embodiment of a step assembly.
Figure 19:
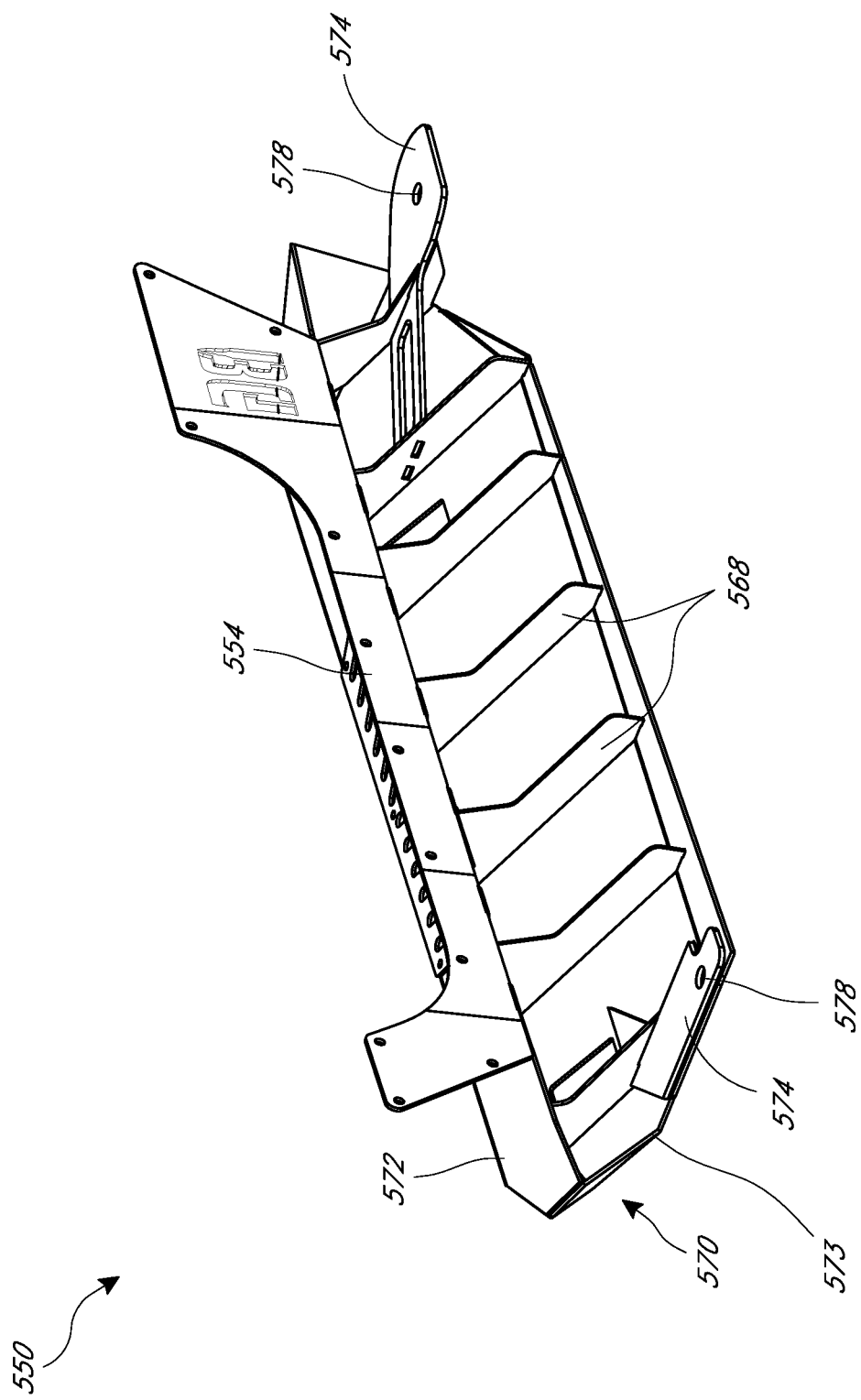
FIG. 19 is a rear perspective view of the step assembly of FIG. 18.
Figure 20:
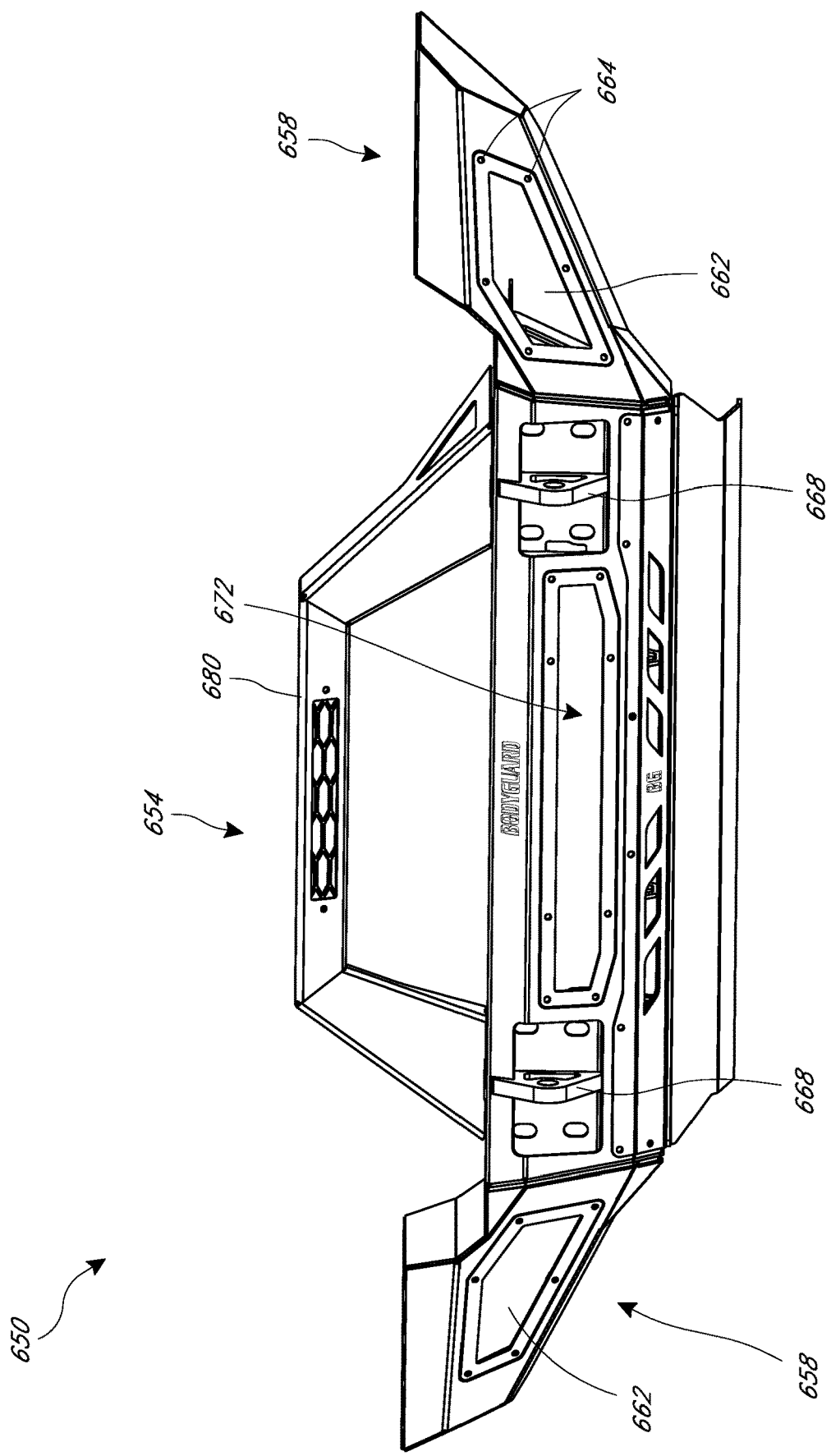
FIG. 20 is a front perspective view of an embodiment of a modular front bumper in a first configuration
Figure 21:
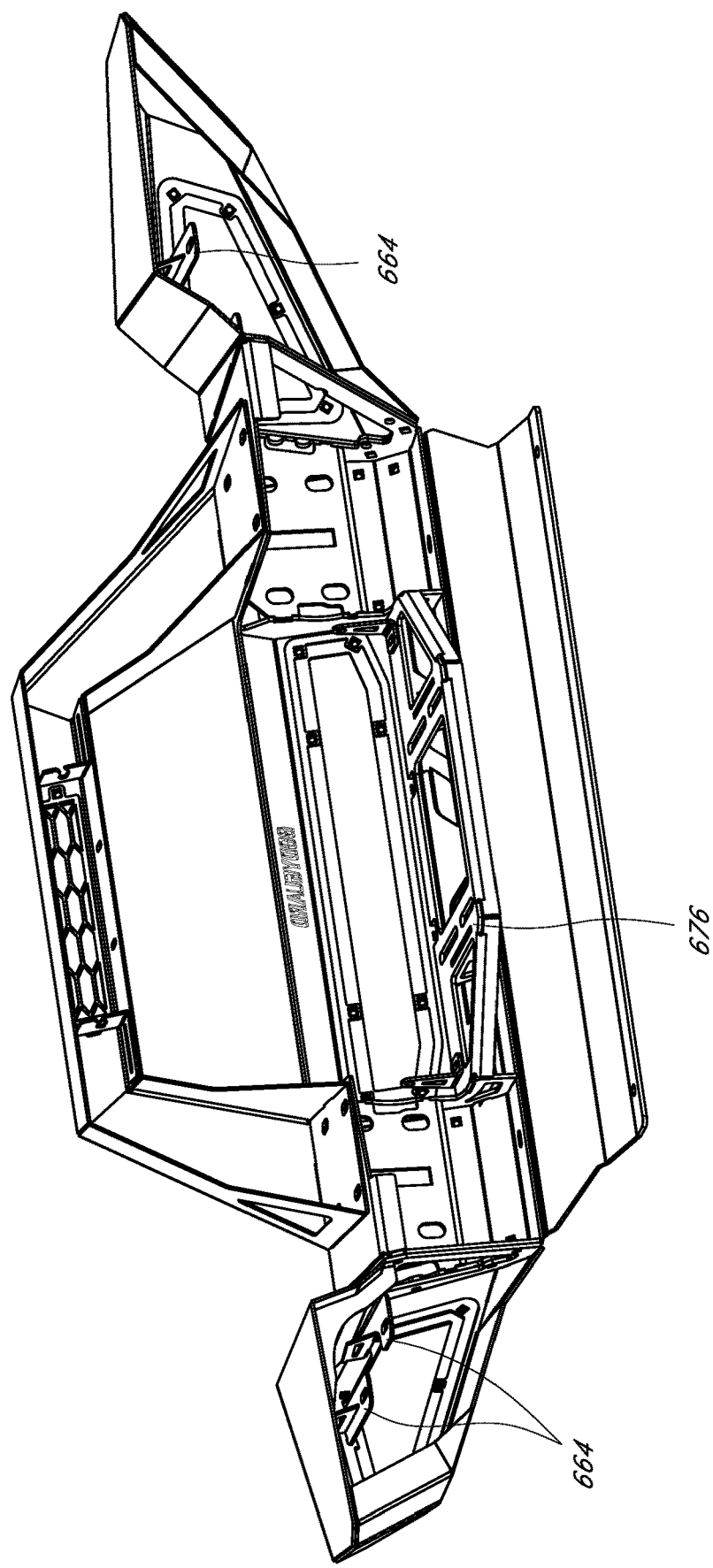
FIG. 21 is a rear perspective view of the bumper of FIG. 20.
Figure 22:
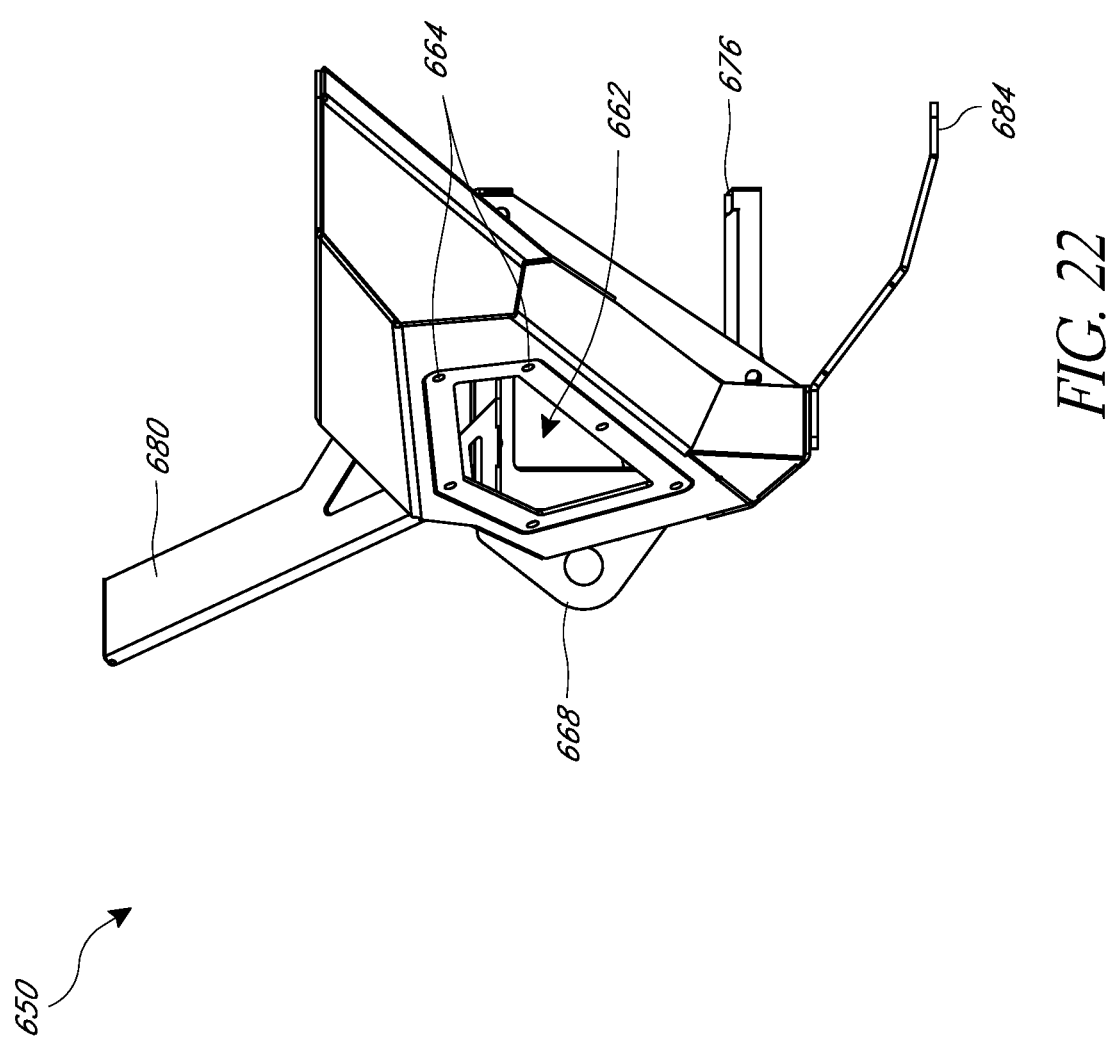
FIG. 22 is a side view of the bumper of FIG. 20.

FIGS. 18 and 19 illustrate another embodiment of an aftermarket step 550. The step 550 can be structured similar to the step 450 and so the same or corresponding elements have the same callout number with the addition of a "5" instead of a "4" leading number. The step 550 can include a mounting portion 554. The mounting portion 554 can include one or more projections 560 and/or 562. The mounting portion 554 can include a plurality of apertures 558 for attaching to the vehicle. The mounting portion 554 can attach to a step portion 570. Step portion 570 can include a flattened step region 572. The flattened step region 572 can be formed from an outer shell 573. The outer shell 573 can comprise a sheet material such as aluminum, steel, plastic or other material.

As shown in FIG. 19 the interior of the mounting of the step 550 can include a plurality of support struts 568. The support struts 568 can provide support to portions of the shell 573. One or more mounting extensions 574 can extend from the mounting portion 554 and/or the step portion 570 to mount and provide additional stability and security by attaching at the vehicle. The mounting extensions 574 can include one or more apertures 578 for attaching to the vehicle. As an alternative or in addition to the mounting extensions 574, the step 550 could utilize a mounting arrangement similar to that shown and described with respect to FIGS. 13-17 including the mounting extensions 474. Similarly, the step 450 could utilize mounting extensions 574 in addition or as an alternative to the mounting extensions 474.

FIGS. 20 through 24 illustrate an embodiment of a modular front bumper 650 of a vehicle. The vehicle can be a Jeep Wrangler. The modular front bumper 650 can include a central portion 654 and one or more peripheral extensions or wing portions 658. The one or more wing portions 658 can attach on opposite sides of the central portion 654. The front modular bumper 650 can include a plurality of features desirable in certain types of vehicles. For example, the front modular bumper can include one or more light mounting apertures 662. The light mounting apertures 662 can be mounted within the peripheral extensions 658. The light mounting apertures 662 can include one or more apertures 664 for mounting with an optional light kit (not shown). The light mounting apertures 662 can be generally forward facing when assembled to the vehicle.

The front modular bumper 650 can include one or more shackle mounting flanges 668. The shackle mounting flanges 668 can be located on the central portion 654. The central portion 654 can also include a central aperture 672. The central aperture 672 can also include one or more mounting locations for a light kit or winch cable. The central portion 654 can include a winch mount location 676. For example, the winch mount location 676 can be a shelf built into and extending in a rearward direction from the front bumper 650. The winch mount location 676 can include a plurality of mount locations for securely attaching the winch into the bumper 650. The central portion 654 can also include an overrider bar, grill guard or baja bar 680 and/or a toe plate 684.

Figure 23:
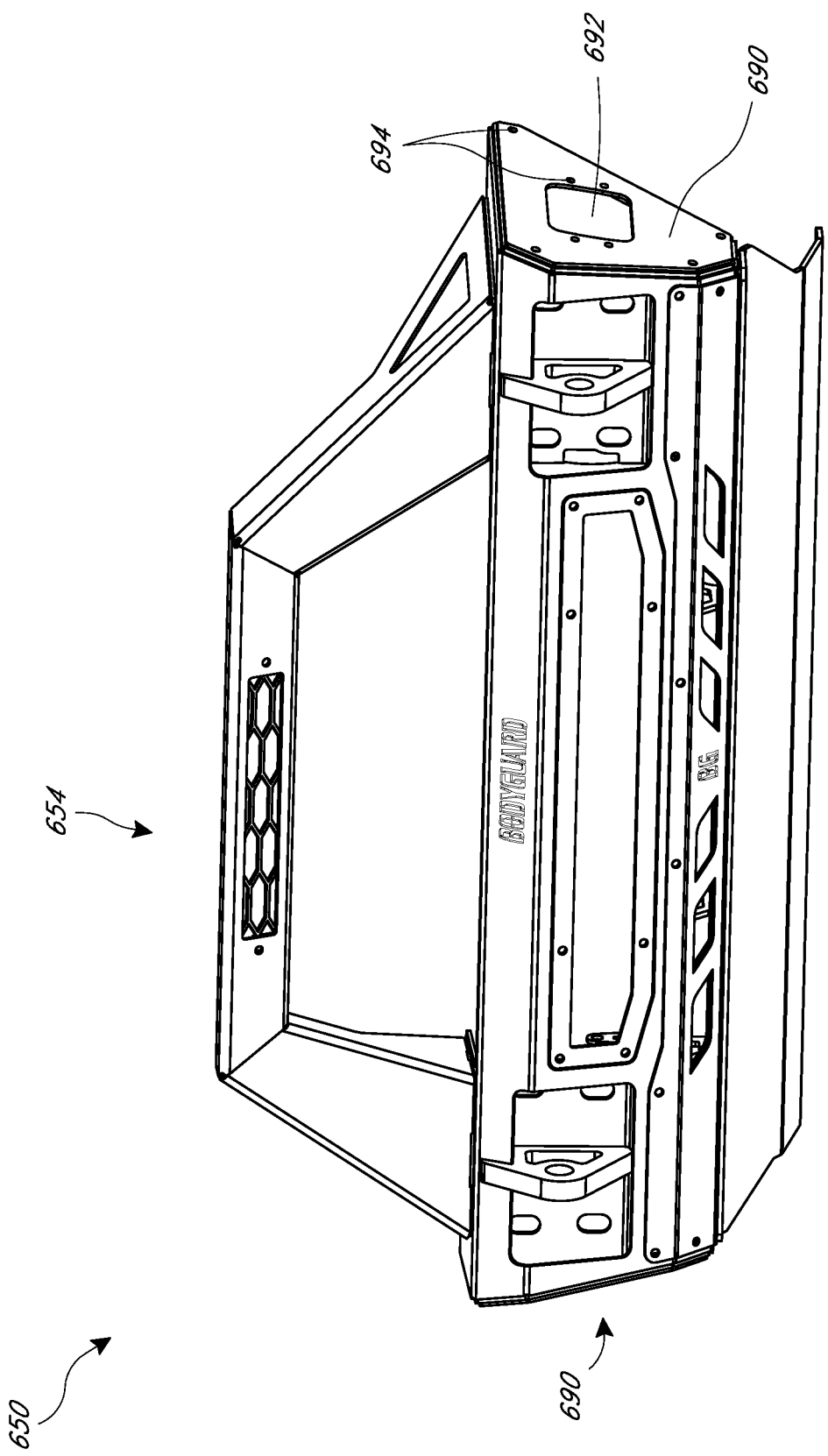
FIG. 23 is a perspective view of the modular front bumper of FIG. 20 in a stubby configuration.

FIG. 23 shows the modular front bumper 650 in a stubby configuration with the extension portions 662 removed. The outer ends of the central portion 654, one or both, can be covered by optional replacement covers 690. The replacement covers 690 can include light mounting apertures 692 and one or more mounting locations 694 for a light kit. The light mounting apertures 692 can point generally sideways (orthogonal to the light mounting apertures 662) when assembled with a vehicle. The mounting cover 690 can include a plurality of apertures or mounting locations for attachment with the central portion 654.

Figure 24:
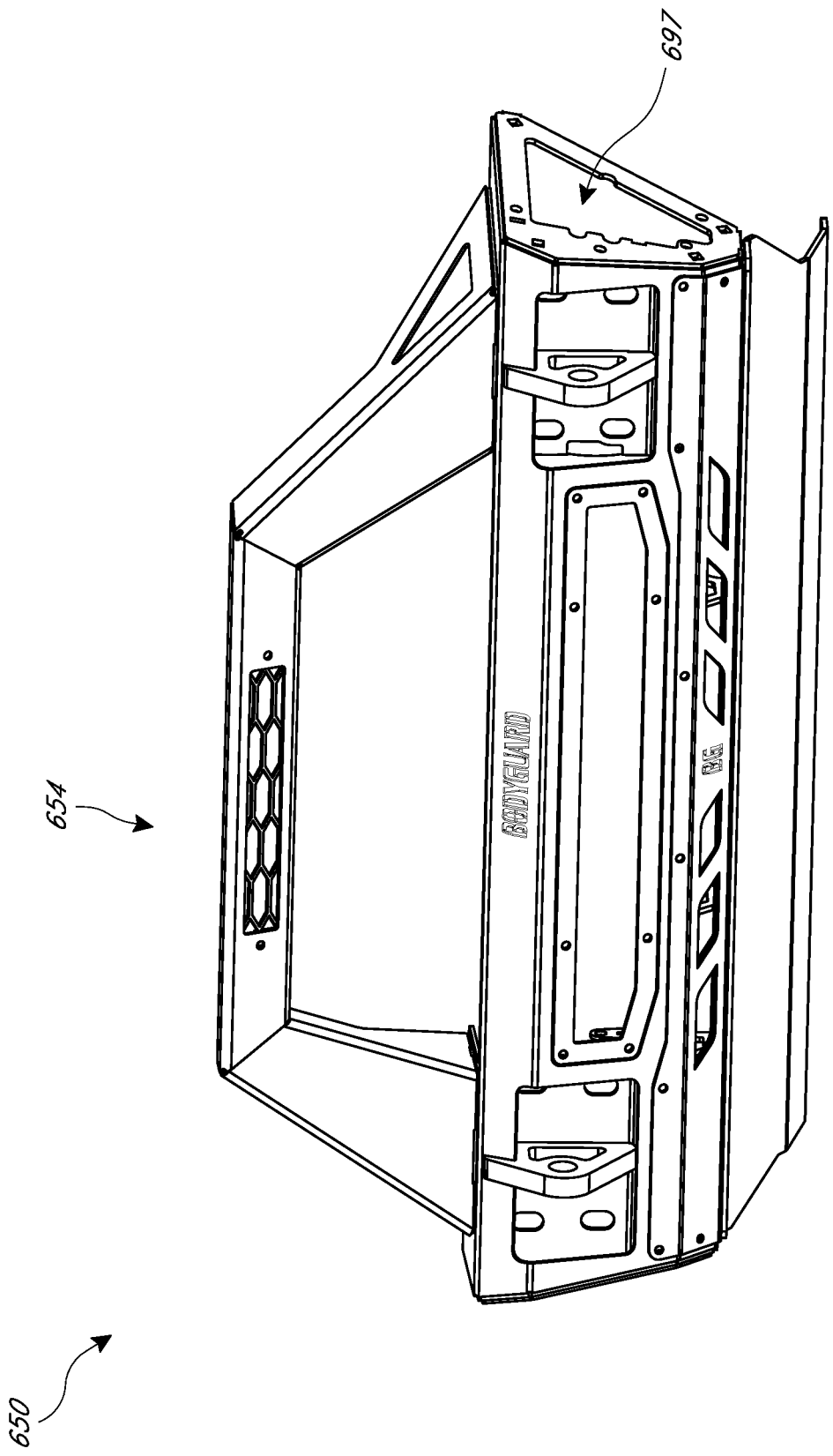
FIG. 24 shows the modular bumper of FIG. 23 without end caps.
Figure 25:
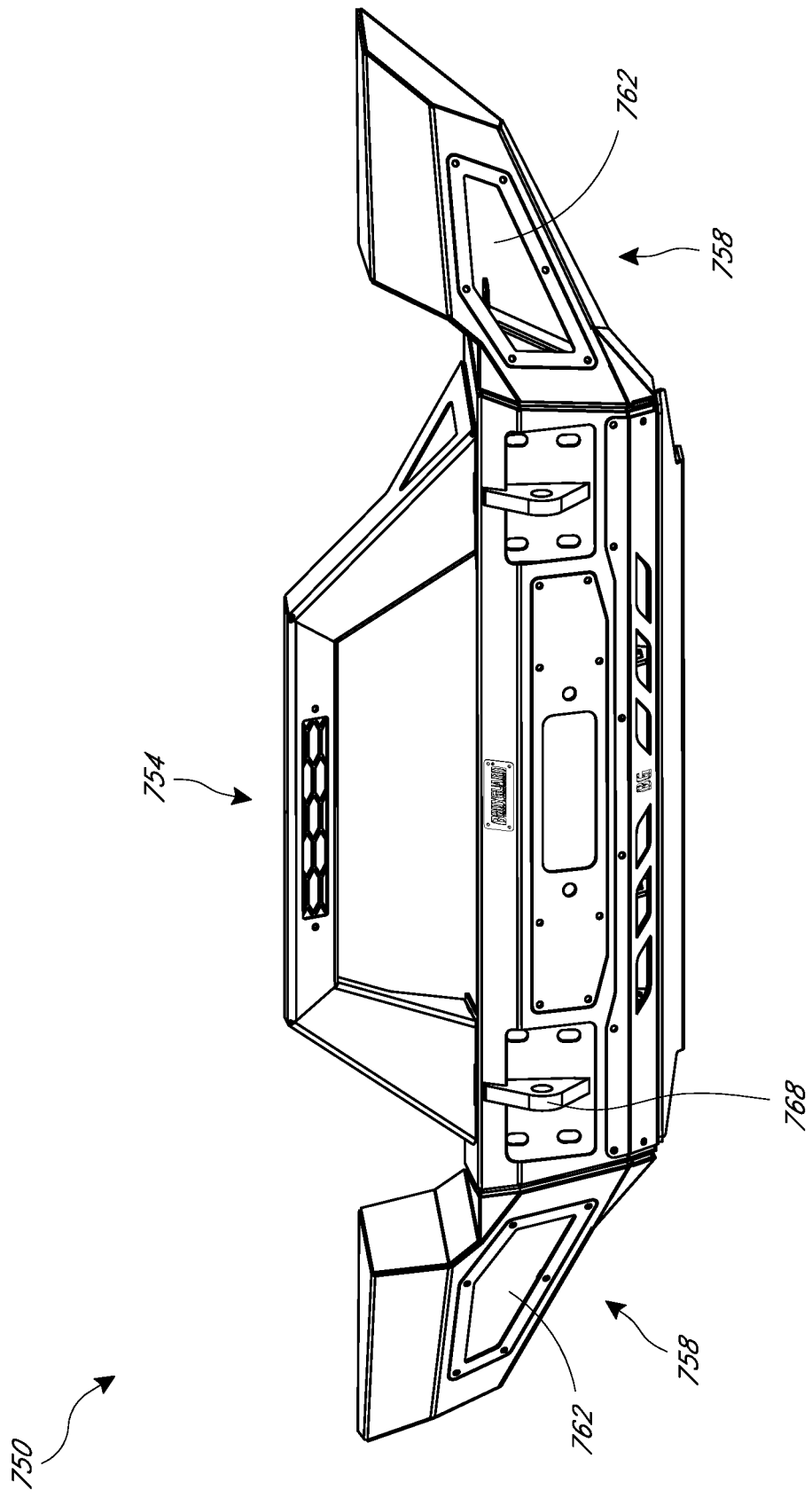
FIG. 25 is a perspective view of another modular front bumper in a first configuration.
Figure 26:
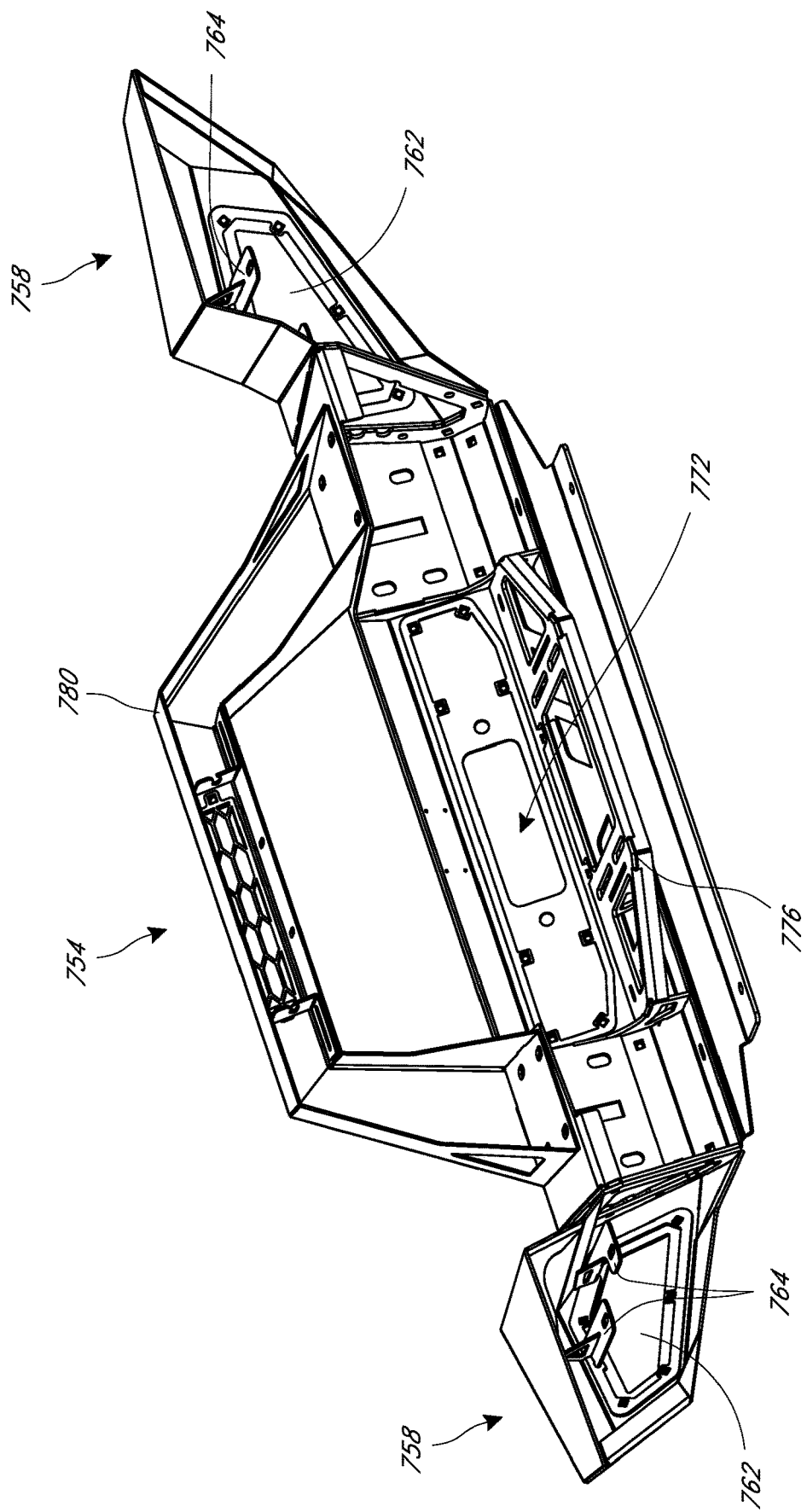
FIG. 26 is a rear perspective view of the modular front bumper of FIG. 25.

FIG. 24 illustrates the central portion 654 of a front bumper 650 without the extension portion 658 or the cap portions 690 showing optional apertures 697. In another implementation, the mounting covers 690 can be solid to close out the ends of the central portion 654 in the aperture 697.

FIGS. 25 through 28 illustrate another embodiment of a front modular bumper 750. Similar structural components of the bumper 750 have the same reference number as the bumper 650, but with a leading "7". The front modular bumper 750 can include a central portion 754. The central portion 754 can attach to one or more outer extension portions 758. Each of the outer extension portions 758 can optionally include light apertures 762 with mounting locations for a light kit that points forward. In this configuration, the front bumper 750 can extend all the way across the front of the vehicle and provide a mounting location for supplemental lights and/or other accessories such as the winch 776, D-ring shackle locations 768 and/or overrider bar, grill guard or baja bar 780.

Figure 27:
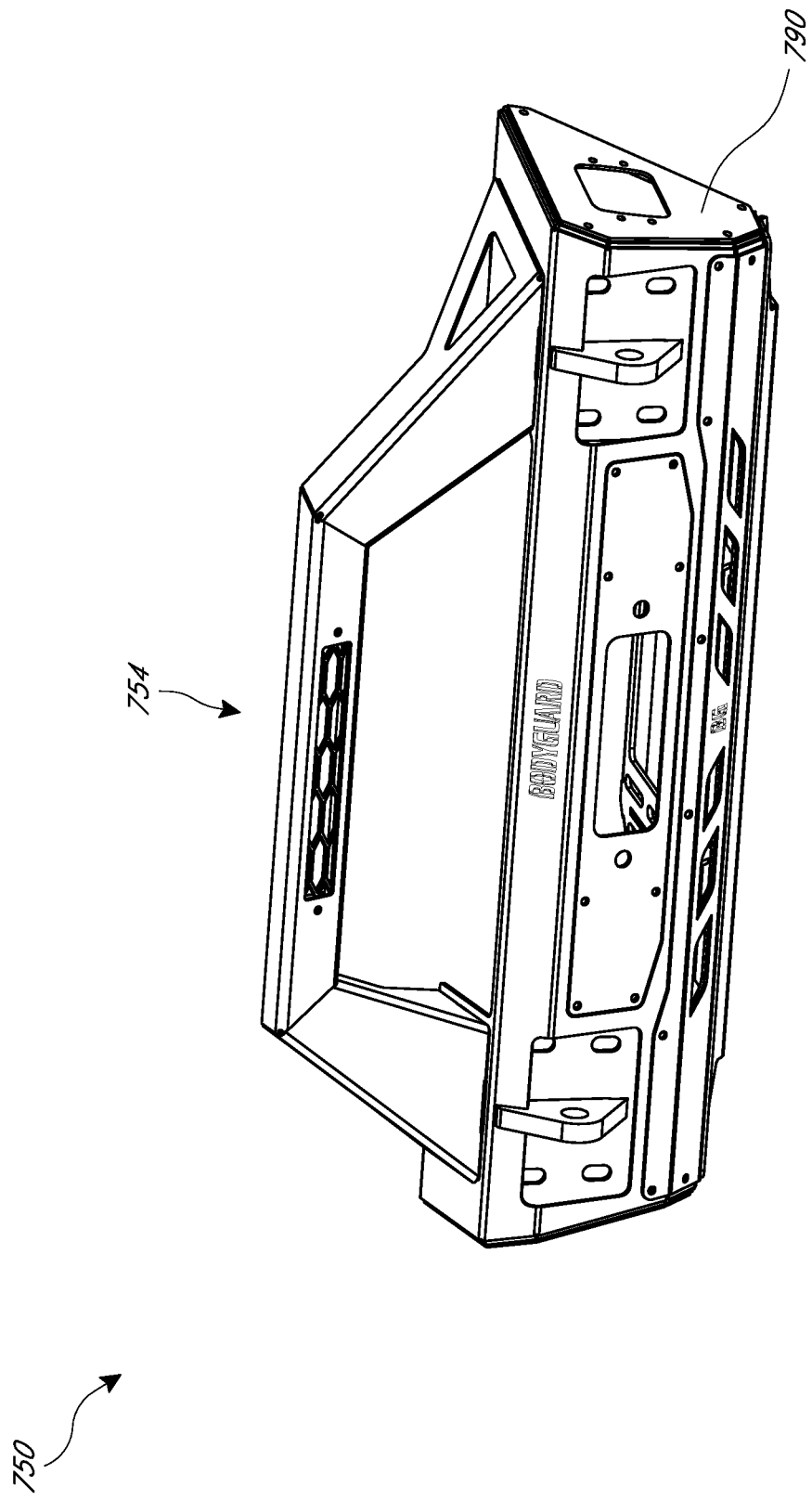
FIG. 27 is a stubby configuration of the modular front bumper of FIG. 25.
Figure 28:
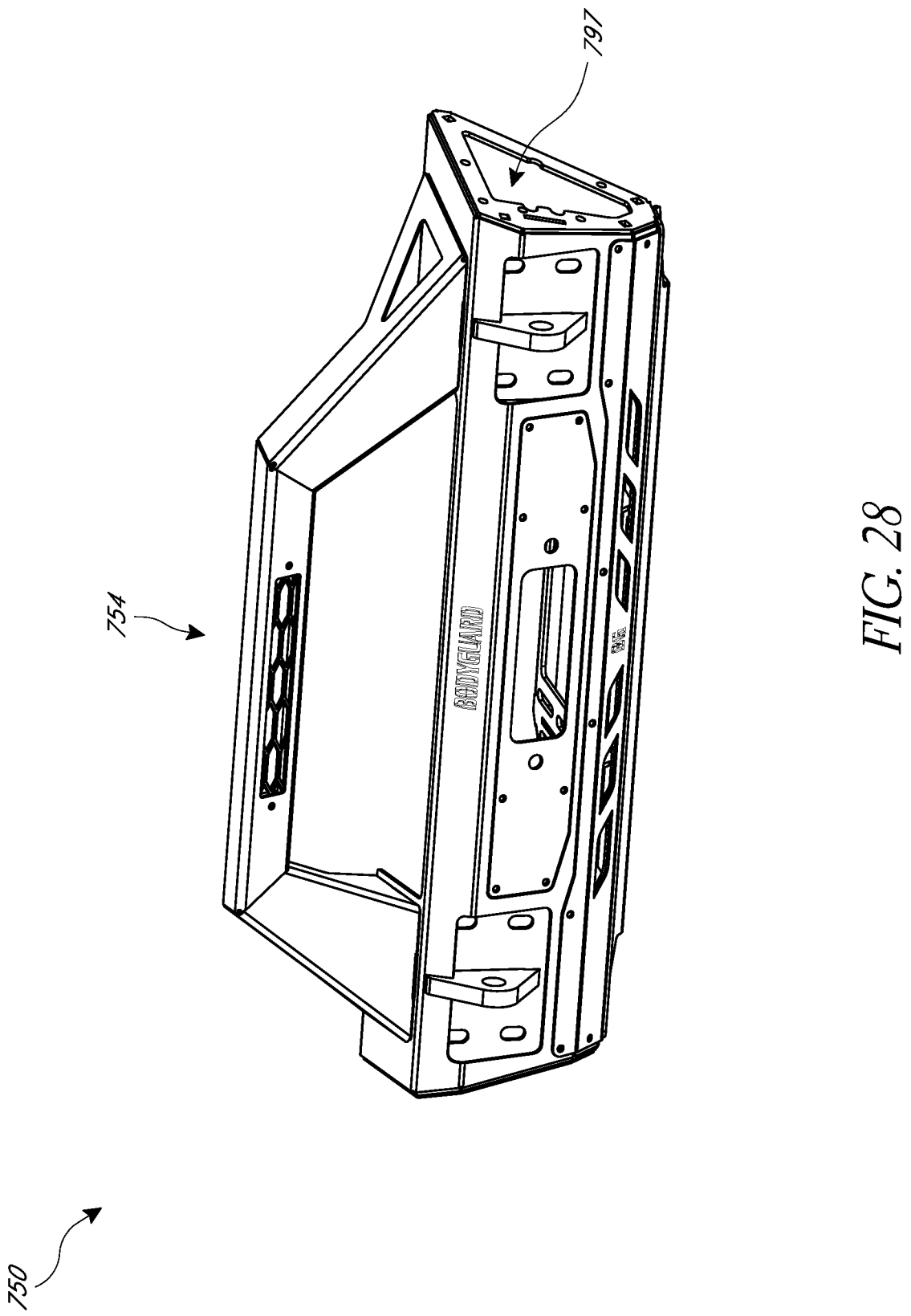
FIG. 28 is a perspective view of the modular bumper of FIG. 27 shown without end caps.
Figure 29:
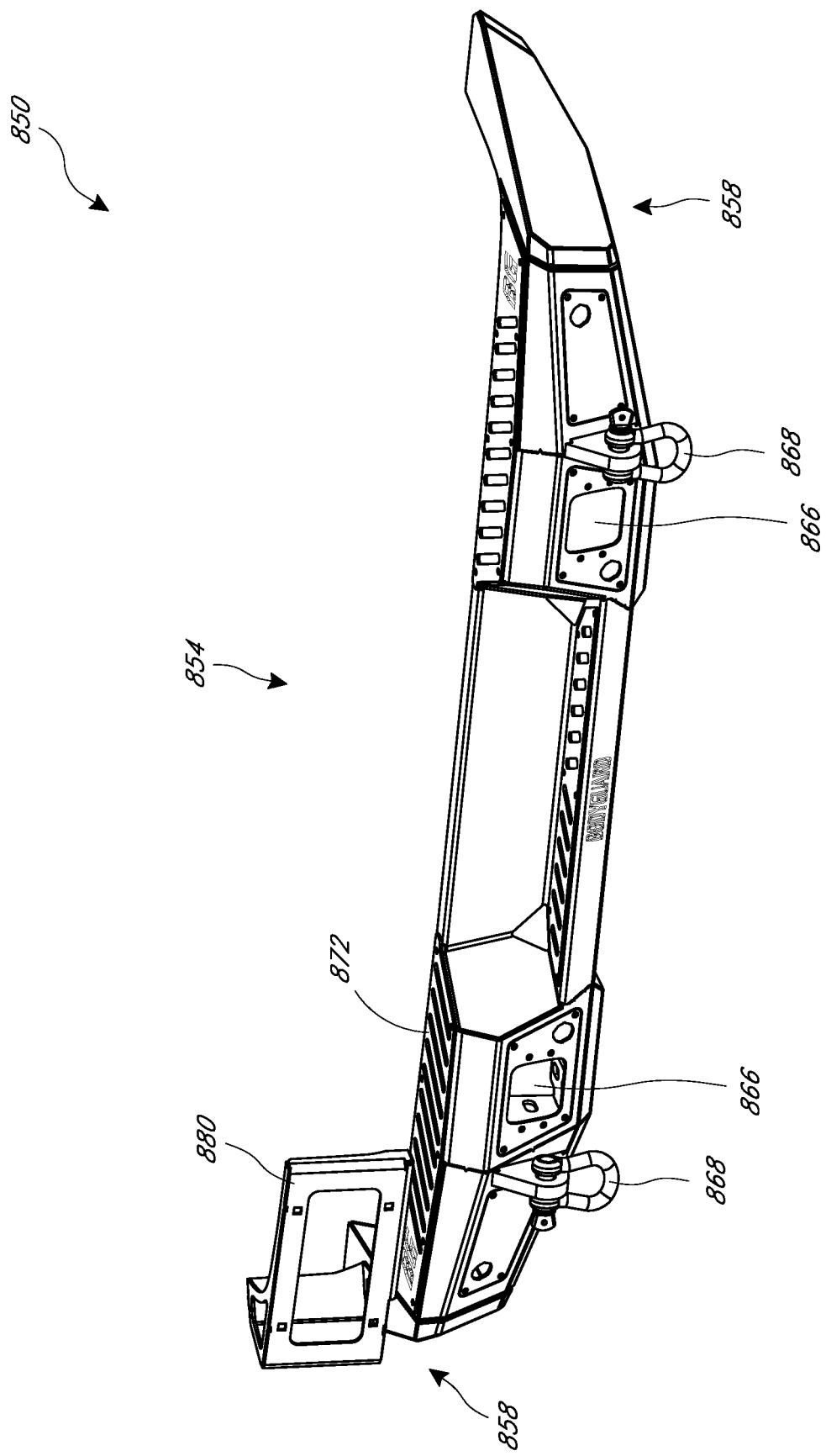
FIG. 29 is a front perspective view of a rear modular bumper in a first configuration.

FIGS. 27 and 28 show the front modular bumper 750 in a stubby configuration with the extension portions 758 removed. The central portion 754 can instead include cap portions 790. The cap portions 790 can optionally include a light kit and mounting locations for the light kit. The light kit can point generally sideways. The cap portions 790 can be removable and replaceable. In this configuration the front bumper 750 does not extend across the entire front of the vehicle. FIG. 28 shows the front bumper 750 without the end caps 790.

FIGS. 29 through 32 illustrate an embodiment of a rear modular bumper 850. The rear modular bumper 850 can include a central portion 854 and one or more peripheral portions 858 attached to outer sides of the central portion 854. The central portion 854 can include an upper step region 872. The central portion 854 can include one or more apertures 866 for mounting light kits within the rear bumper 850. It can include one or more flanges for attaching D-ring shackles 868.

Figure 30:
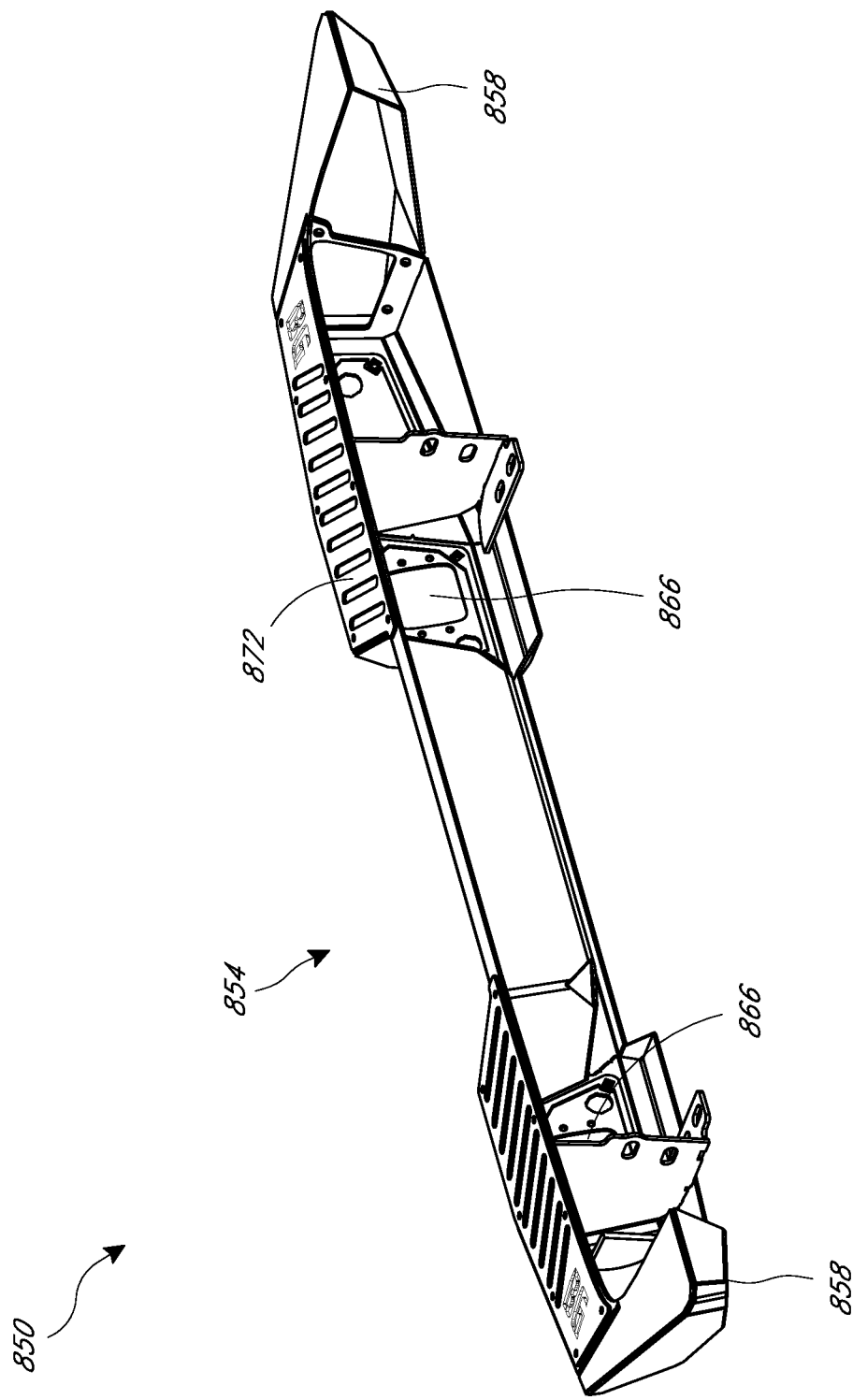
FIG. 30 is a rear perspective view of the rear modular bumper of FIG. 29.

Peripheral portions 858 can extend all the way across the back of the vehicle and/or around rear corners of the vehicle. Peripheral portions 858 can be curved or extend laterally from the central portion 854. The central portion 854 and/or one of the peripheral portions 858 can include an optional license plate mounting location plate 880. FIG. 30 shows a rear perspective view without the license plate mounting location 880.

Figure 31:
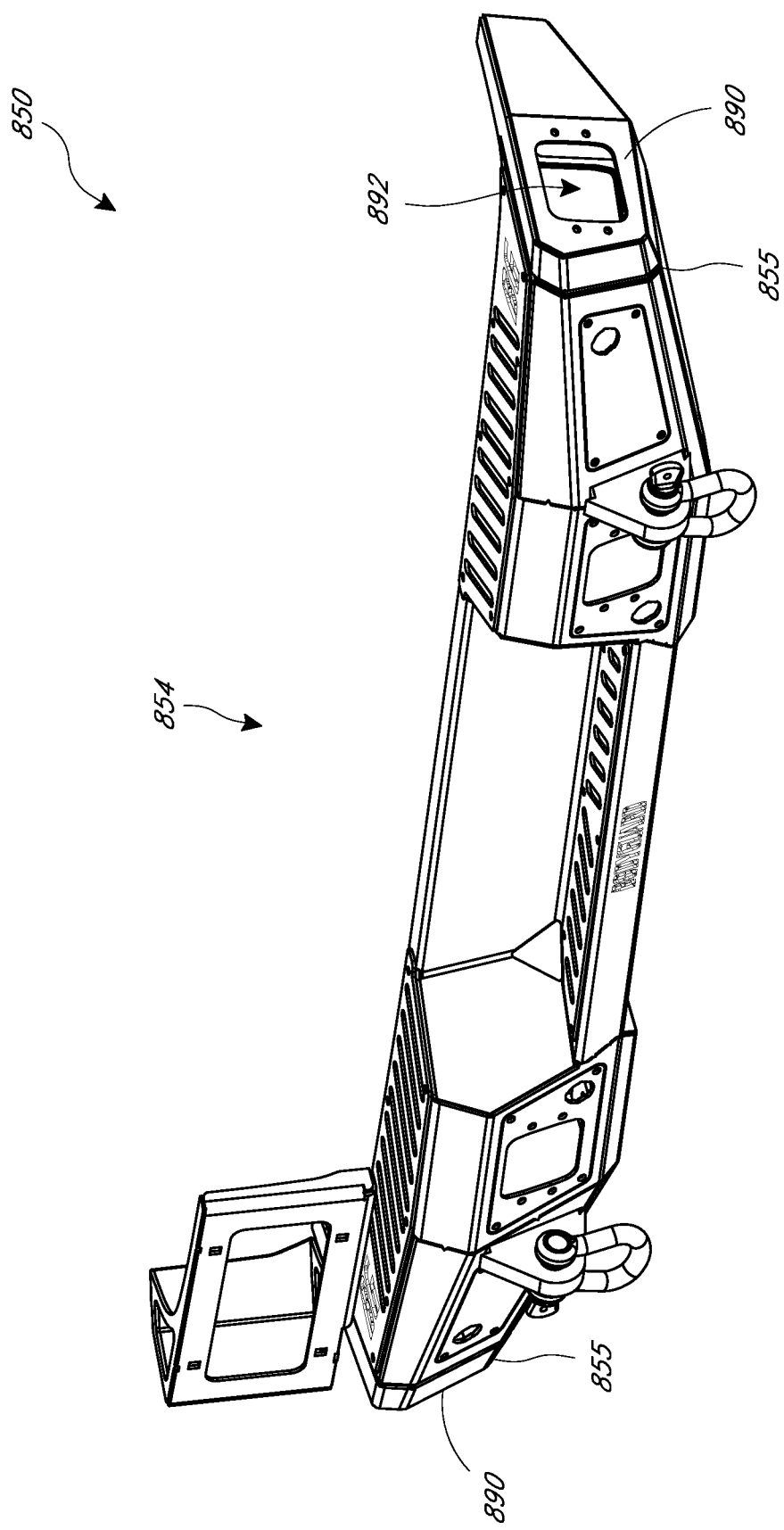
FIG. 31 is a front perspective view of the modular rear bumper of FIG. 29 in a stubby configuration.
Figure 32:
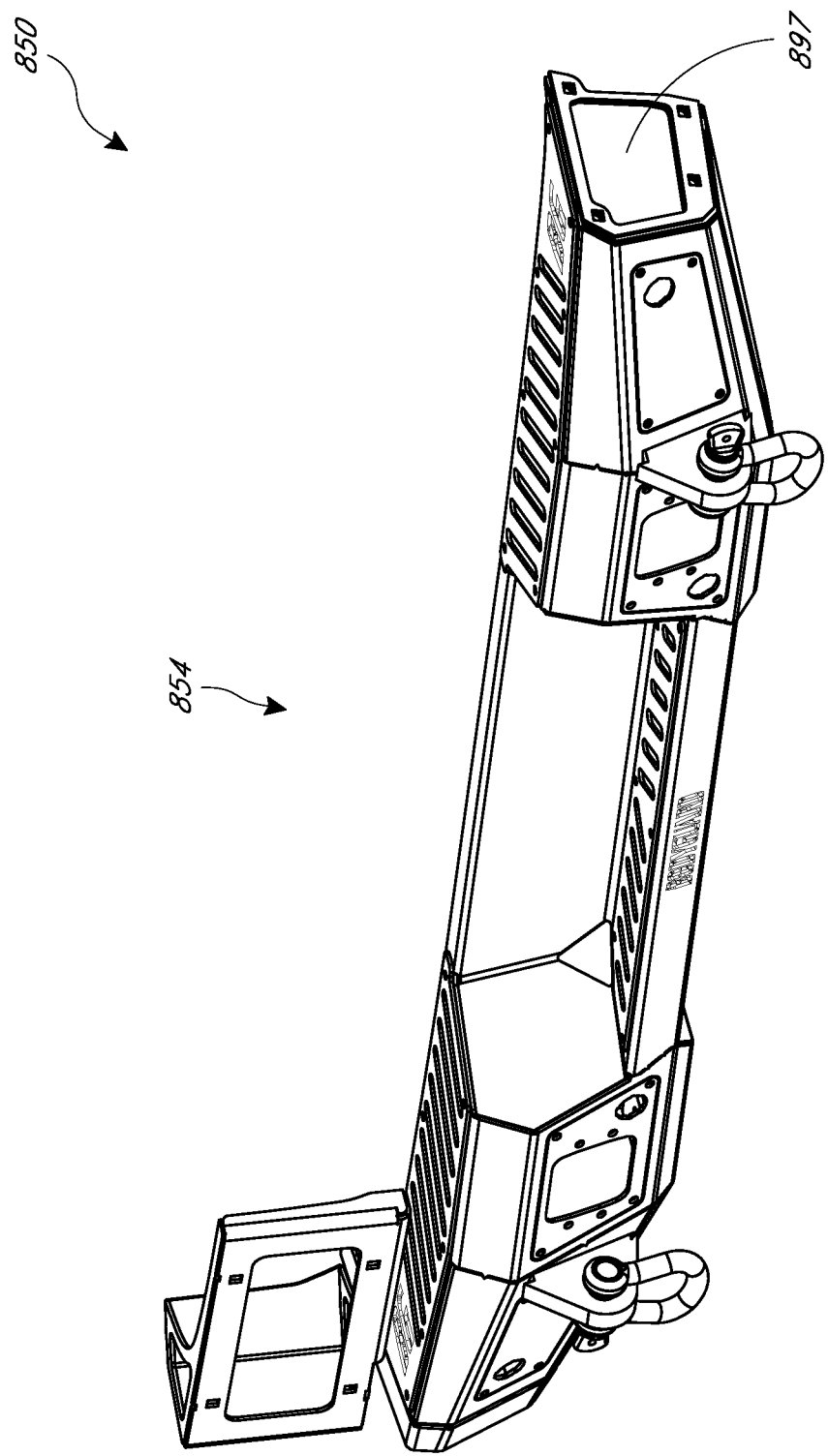
FIG. 32 shows the modular rear bumper of FIG. 31 without one end cap.

FIG. 31 illustrates the rear bumper 850 having the peripheral portions 858 removed and replaced by end caps 890. The caps 890 can look similar to the extension portions 858 and can extend laterally from the central portion 854. In other implementations, the end caps 890 can be short so as to not extend laterally from the central portion 854. In some implementations, the caps 890 do not extend as far laterally as the peripheral portions 858. The caps 890 can include light mounting apertures that are oriented generally sideways. As shown in FIG. 32, the ends of the central portion 854 can include apertures 855 that can be covered by the caps 890.

Figure 33:
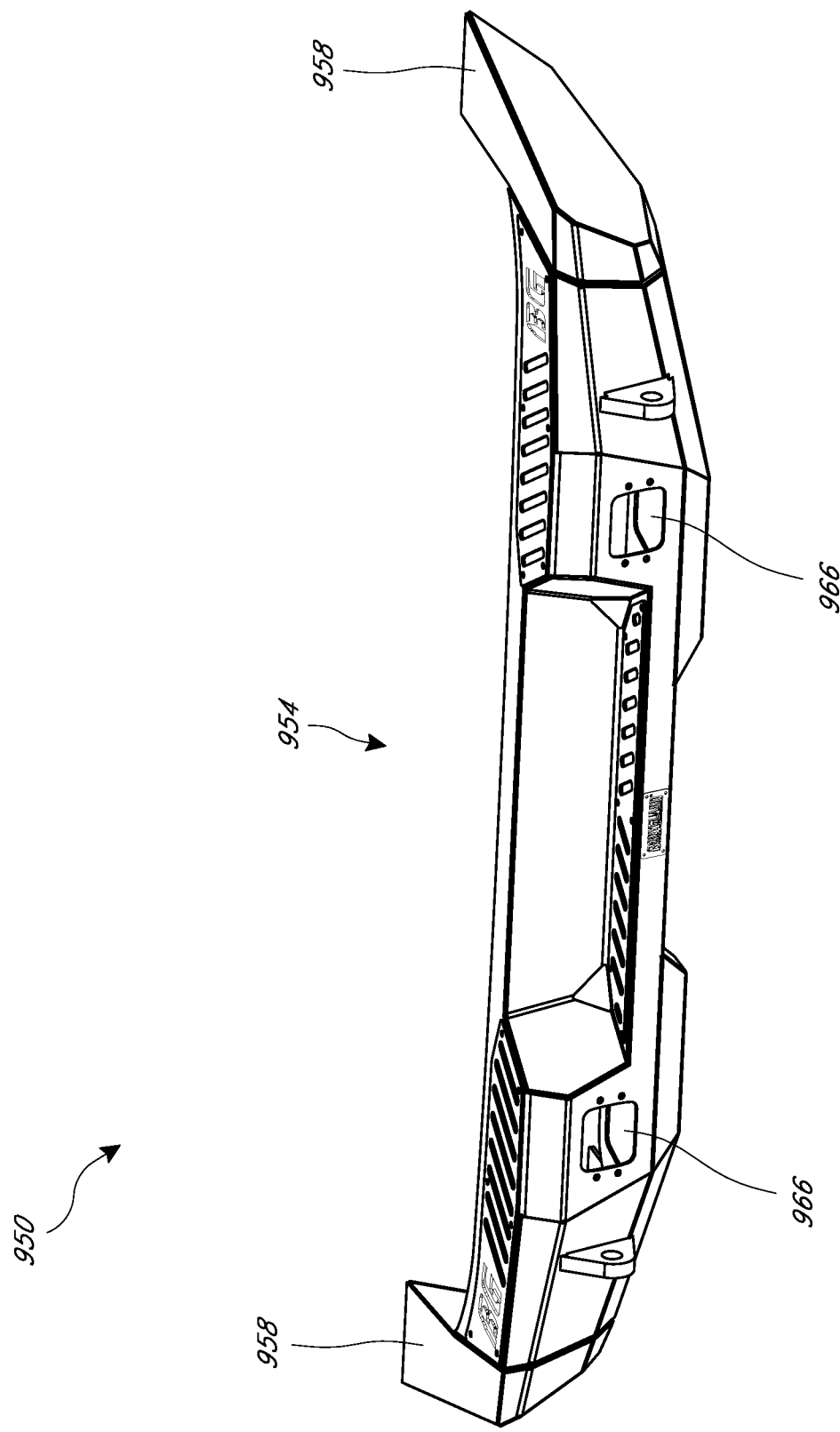
FIG. 33 is a front perspective view of a modular rear bumper according to another embodiment in a first configuration.
Figure 34:
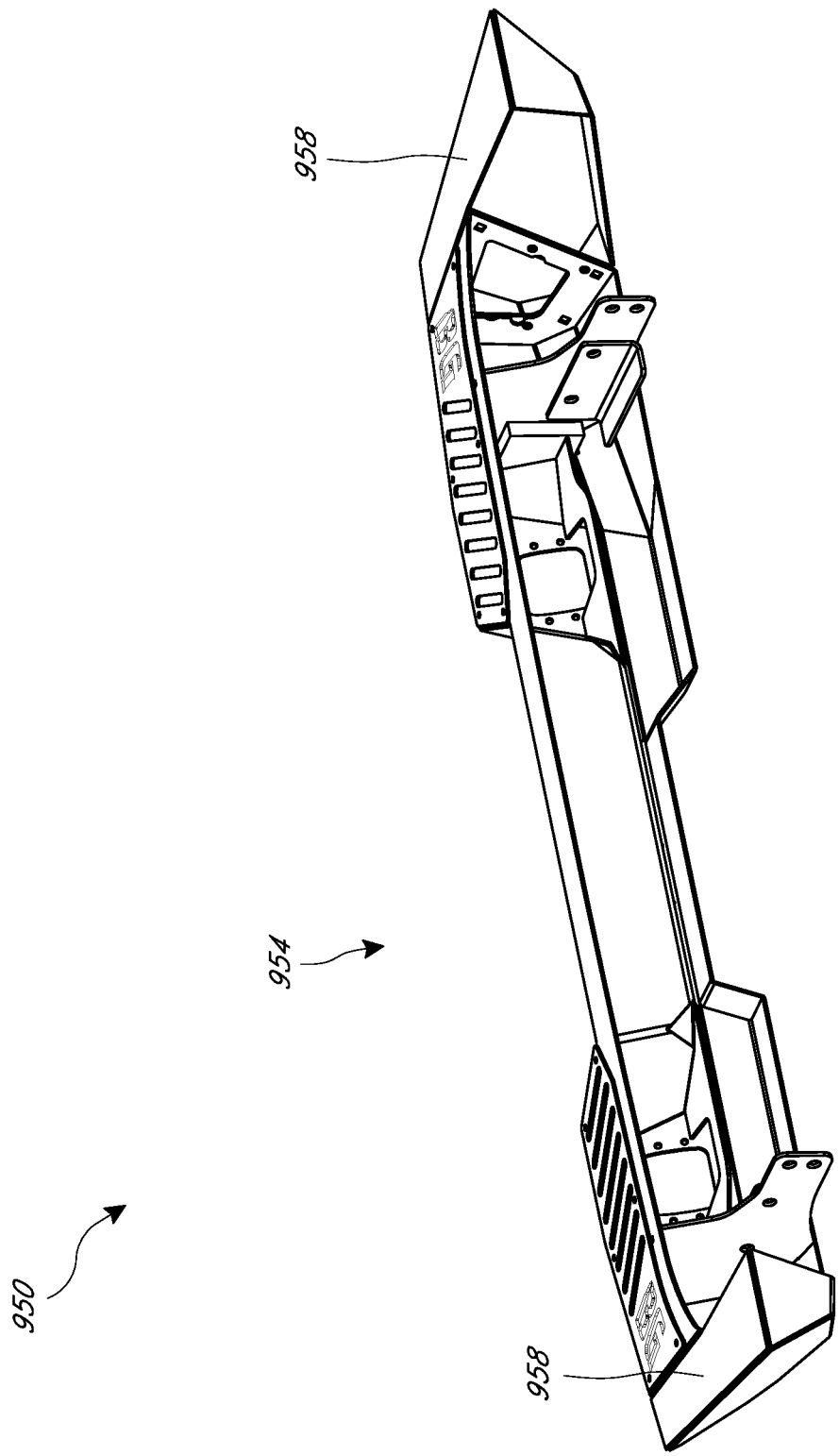
FIG. 34 is a rear perspective view of the rear modular bumper of FIG. 33.
Figure 35:
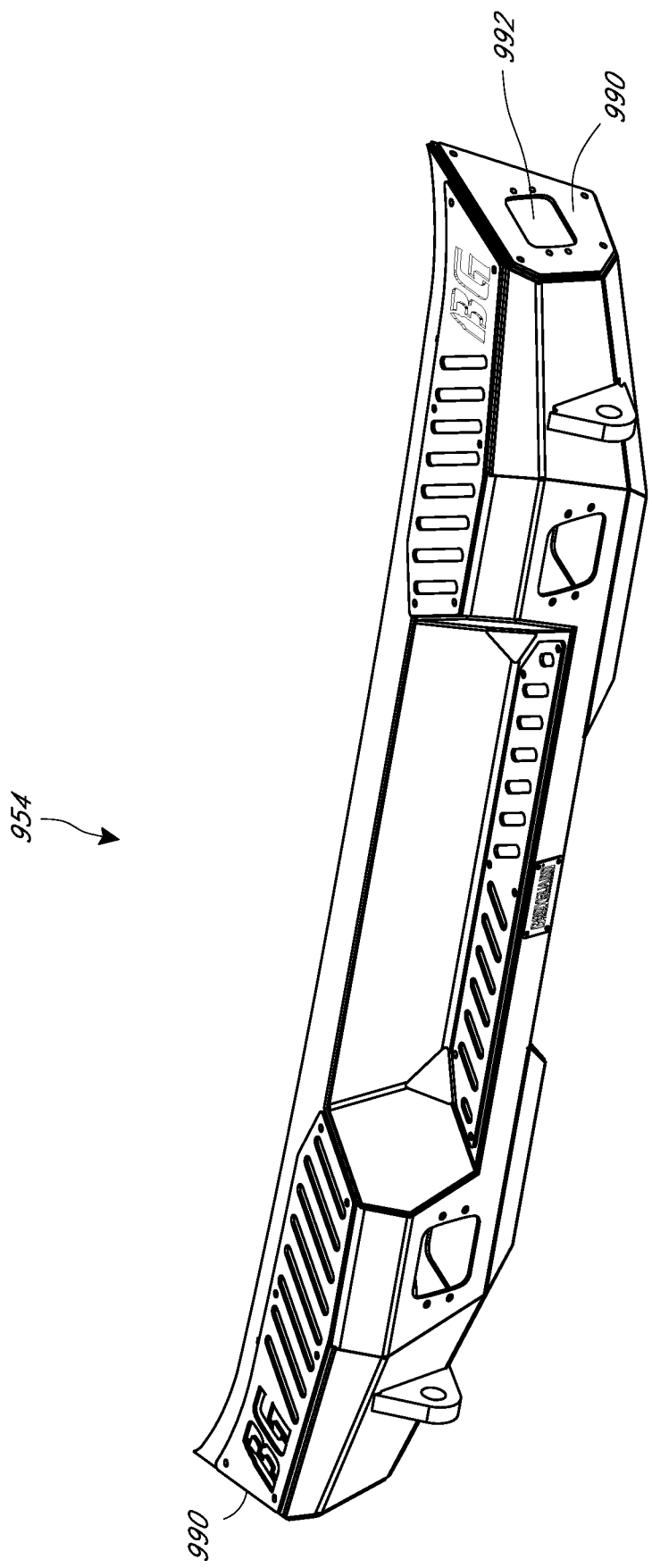
FIG. 35 is a front perspective view of the modular bumper of FIG. 33 shown in a stubby configuration having end caps.

FIGS. 33 through 35 illustrate another embodiment of a rear modular bumper 950 with similar structures as the bumper 850. Reference numbers of similar structures are labeled with a leading "9" instead of an "8." The rear modular bumper 950 can include a central portion 954 and one more peripheral portions 958 in the first configuration. The central portion 954 can include one or more light apertures for mounting a light kit 966.

Figure 36:
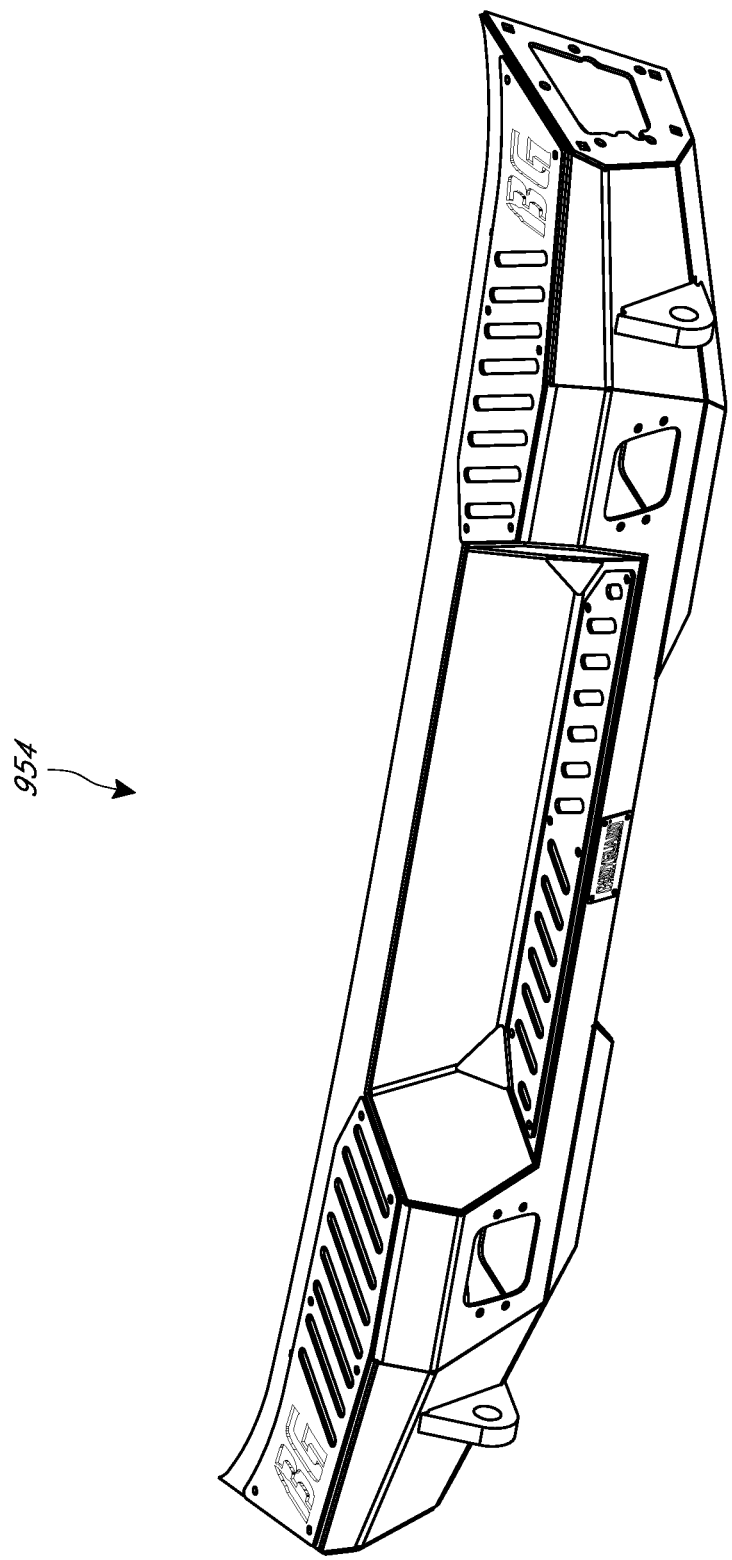
FIG. 36 is a front perspective view of a modular rear bumper of FIG. 35 shown without end caps.

FIG. 35 illustrates the rear modular bumper 950 in the stubby configuration with the peripheral portions 958 removed and replaced by end caps 990 (removed in FIG. 36). The end caps 990 can have a lower profile than the peripheral portions 958. In some implementations the end caps 990 can include a light aperture with mounting locations for a light kit 992 that is generally sideways oriented.

FIG. 37 shows an attachment bracket 1001 that can be attached at one of the ends 1002 of a fender flare mounting plate (such as ends 72, 74). The bracket 1001 can include a first attachment flange 1003 with an aperture for attachment to the mounting plate. A second attachment flange 1004 can mount with a vehicle body. A support plate 1005 can provide rigidity to the bracket 1001. Either of the flange can include attached threaded supports (e.g., nuts).

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A fender flare comprising:
   a mounting plate portion, the mounting plate portion being configured to be mounted to a vertical portion of a wheel well of a vehicle body;
   a fender portion; and
   a plurality of strut plates supporting the fender portion outwardly and above the mounting plate portion such that a gap is present between an edge of the mounting plate portion and an adjacent edge of the fender portion, and the fender portion is positioned above a wheel space of the wheel well of the vehicle body.

2. The fender flare of claim 1, wherein the mounting plate portion comprises a generally flat plate and includes a plurality of apertures for receiving mechanical fasteners to mount the fender flare to the vehicle body at the wheel well.

3. The fender flare of claim 1, wherein the mounting plate portion comprises one or more angled portions connecting thereto, the angled portions including one or more apertures for receiving mechanical fasteners to mount the fender flare to the vehicle body at the wheel well.

4. The fender flare of claim 1, wherein the strut plates are attached at a first end to the mounting plate portion and at a second end to the fender portion.

5. The fender flare of claim 1, wherein each of the strut plates comprises a cutout section that when assembled to the wheel well of the vehicle body, the cutout section extends outwardly and around a curved ridge of the wheel well of the vehicle body.

6. The fender flare of claim 5, wherein the first and second ends of the strut plates are at an angle between 60 and 120 degrees.

7. The fender flare of claim 6, wherein the first and second ends of the strut plates are at right angles.

8. The fender flare of claim 1,
   A fender flare comprising:
   a mounting plate portion, the mounting plate portion being configured to be mounted to a wheel well of a vehicle body;
   a fender portion; and
   a plurality of strut plates supporting the fender portion outwardly or above the mounting plate portion such that a gap is present between an edge of the mounting plate portion and an adjacent edge of the fender portion;
   wherein the gap provides an offset between the mounting plate and the fender portion, a curved ridge of the wheel well received within the gap when the fender flare is assembled with the vehicle body.

9. The fender flare of claim 8, wherein the gap portion extends throughout a length of the fender flare.

10. The fender flare of claim 8, having a first end and a second end, the fender portion and the mounting plate portion connected at the first or second ends and the gap extending between the first and second ends.

11. The fender flare of claim 8, wherein the plurality of strut plates each extend from the mounting plate portion perpendicularly and coupled with the fender portion perpendicularly.

12. The fender flare of claim 8, wherein the fender flare is formed of a steel, an aluminum, or a plastic material.

13. The fender flare of claim 12, wherein the fender flare is formed of a plurality of steel pieces coupled together.

14. A fender flare comprising:
   a mounting plate portion configured to be mounted to an outer wall portion of a wheel well of a vehicle body;
   a fender portion; and
   a plurality of strut plates supporting the fender portion relative to the mounting plate portion;
   wherein the mounting plate portion and the fender portion are formed as arcs generally following the wheel well, the fender portion located above the mounting plate portion.

15. The fender flare of claim 14, wherein the mounting plate portion comprises a generally flat plate and includes a plurality of apertures for receiving mechanical fasteners to mount the fender flare to the vehicle body at the wheel well.

16. The fender flare of claim 14, wherein the mounting plate portion comprises one or more angled portions connected thereto, the angled portions including one or more apertures for receiving mechanical fasteners to mount the fender flare to the vehicle body at the wheel well.

17. The fender flare of claim 14, wherein the strut plates are attached at a first end to the mounting plate portion and at a second end to the fender portion.

18. The fender flare of claim 14, wherein the fender flare comprises a first end, a central portion and a second end, the fender portion and the mounting plate portion connected at least at the first end, the central portion, and the second end by the plurality of strut plates.

19. The fender flare of claim 14, wherein the fender flare is formed of a steel, an aluminum, or a plastic material.

20. The fender flare of claim 19, wherein the fender flare is formed of a plurality of steel pieces coupled together.

21. The fender flare of claim 1, wherein the fender flare comprises a first end, a central portion and a second end, the fender portion and the mounting plate portion connected at least at the first end, the central portion, and the second end by the plurality of strut plates.

22. The fender flare of claim 8, wherein the fender flare comprises a first end, a central portion and a second end, the fender portion and the mounting plate portion connected at least at the first end, the central portion, and the second end by the plurality of strut plates.

* * * * *